(12) United States Patent
Siefer et al.

(10) Patent No.: US 10,085,326 B2
(45) Date of Patent: Sep. 25, 2018

(54) POWER OVER ETHERNET LIGHTING SYSTEM WITH BATTERY CHARGE CONTROL ALGORITHM

(71) Applicant: Platformatics, Inc., Bloomington, IN (US)

(72) Inventors: Michael Jay Siefer, Bremen, IN (US); Arthur Alvin Harper, III, Bloomington, IN (US)

(73) Assignee: Platformatics, Inc., Bloomington, IN (US)

( * ) Notice: Subject to any disclaimer, the term of this patent is extended or adjusted under 35 U.S.C. 154(b) by 0 days.

(21) Appl. No.: 15/941,591

(22) Filed: Mar. 30, 2018

(65) Prior Publication Data

US 2018/0228007 A1    Aug. 9, 2018

Related U.S. Application Data

(63) Continuation-in-part of application No. 15/701,939, filed on Sep. 12, 2017, now Pat. No. 9,967,955.
(60) Provisional application No. 62/400,968, filed on Sep. 28, 2016, provisional application No. 62/510,541, filed on May 24, 2017.

(51) Int. Cl.
*H05B 37/02* (2006.01)
*H02J 9/00* (2006.01)
*H02J 7/00* (2006.01)
*H05B 33/08* (2006.01)

(52) U.S. Cl.
CPC .......... *H05B 37/0254* (2013.01); *H02J 7/007* (2013.01); *H02J 7/0068* (2013.01); *H05B 33/0842* (2013.01)

(58) Field of Classification Search
CPC .......... H05B 37/02; H05B 37/0254; H05B 37/0263; H05B 33/08; H05B 33/0842; H05B 33/0884; H05B 33/0806; H02J 9/00; H02J 9/005; H02J 9/02

See application file for complete search history.

(56) References Cited

U.S. PATENT DOCUMENTS 5,652,893 A    7/1997  Ben-Meir et al.
7,294,940 B2   11/2007 Grolnic et al.
(Continued)

FOREIGN PATENT DOCUMENTS

CN    103293480    9/2013
WO    2017017546   2/2017

*Primary Examiner* — Thai Pham
(74) *Attorney, Agent, or Firm* — Liell + McNeil

(57) ABSTRACT

A power over ethernet lighting system includes a plurality of nodes electrically connected to a power/communication bus. Each of the nodes includes a PoE interface, a micro-controller and a PoE driver electrically connected to a PoE luminaire. At least one of the nodes is an emergency management node that includes a rechargeable battery and a PoE battery charger. The system has a maintained mode in which the PoE luminaire of each of the nodes is powered by electricity from the power/communication bus, and has an emergency mode characterized by a power loss on the power/communication bus. A micro-controller of the emergency management node includes a charge control algorithm configured to determine a charge level of the battery based on a signal from a charge sensor, and configured to dynamically adjust an allocation of power to the PoE battery charger responsive to the charge level.

20 Claims, 19 Drawing Sheets

(56) References Cited

U.S. PATENT DOCUMENTS

| | | | |
|---|---|---|---|
| 7,321,302 B2 | 1/2008 | Beghelli | |
| 7,737,640 B2* | 6/2010 | Marques | H05B 37/04 |
| | | | 315/160 |
| 8,457,793 B2 | 6/2013 | Golding et al. | |
| 9,277,632 B2 | 3/2016 | Hegarty | |
| 9,544,976 B2 | 1/2017 | Snyder et al. | |
| 9,596,727 B2 | 3/2017 | Leinen et al. | |
| 9,596,739 B2 | 3/2017 | Laherty et al. | |
| 9,609,706 B2 | 3/2017 | Crenshaw | |
| 9,679,448 B2 | 6/2017 | Koosha et al. | |
| 9,730,299 B2 | 8/2017 | Stewart | |
| 2007/0263333 A1* | 11/2007 | Apfel | H02H 9/041 |
| | | | 361/91.1 |
| 2012/0043889 A1 | 2/2012 | Recker et al. | |
| 2015/0195883 A1* | 7/2015 | Harris | H05B 33/0845 |
| | | | 315/155 |
| 2015/0264780 A1* | 9/2015 | Harris | H05B 33/0845 |
| | | | 315/152 |
| 2016/0036268 A1 | 2/2016 | Laherty et al. | |
| 2016/0273722 A1* | 9/2016 | Crenshaw | H05B 33/0818 |

\* cited by examiner

POWER OVER ETHERNET LIGHTING SYSTEM WITH BATTERY CHARGE CONTROL ALGORITHM

TECHNICAL FIELD

The present disclosure relates generally to power over ethernet (PoE) lighting systems for buildings, and more particularly to power over ethernet lighting systems that include both a maintained mode during normal operation and an emergency mode during times of power loss.

BACKGROUND

It is well known that commercial and public buildings are typically required to have a back up emergency lighting system in case of a power outage on a segment of the power grid supplying electrical power to the respective building. These emergency lights are often individualized units that include a rechargeable battery and one or more incandescent lights that are powered by the battery in the event of a power loss to the building.

More recently, there has been a growing interest in lighting systems for buildings using low voltage power over ethernet systems and associated PoE luminaires, which are often one or more light emitting diode (LED) arrays. Power over ethernet lighting systems allow for new capabilities that would be impossible or extremely difficult to accomplish with traditional power grid type lighting systems. Among the new possibilities with power over ethernet lighting systems is the ability to incorporate emergency lighting systems and strategies for the same, while still meeting all associated codes and regulations required for emergency management services.

The present disclosure is directed toward power over ethernet lighting systems that are operable in both the maintained mode during normal operations, and an emergency mode when there is a power loss.

SUMMARY OF THE DISCLOSURE

A power over ethernet lighting system includes a plurality of nodes electrically connected to a power/communication bus with a PoE interface. Each of the nodes is electrically connected to a PoE luminaire. Each of the nodes includes the PoE interface, a micro-controller and a driver electrically connected to the PoE luminaire. At least one of the nodes is an emergency management node that includes a rechargeable battery and a PoE battery charger. The micro-controller of the emergency management node is electrically connected to the rechargeable battery. The system has a maintained mode in which the PoE luminaire of each of the nodes, including the emergency management node, is powered by electricity from the power/communication bus as controlled by the respective micro-controller, which is powered by one of the power/communication bus and the rechargeable battery. The system has an emergency mode characterized by a power loss on the power/communication bus, and the PoE luminaire of the emergency management node is powered by electricity from the rechargeable battery as controlled by the micro-controller, which is powered by the rechargeable battery. The emergency management node includes a charge sensor operably coupled to the battery and in communication with the respective micro-controller. The micro-controller of the emergency management node includes a charge control algorithm configured to determine a charge level of the battery based on a signal from the charge sensor, and configured to dynamically adjust an allocation of power to the PoE battery charger responsive to the charge level.

In another aspect, a method of operating a power over ethernet lighting system includes communicating a charge level of a rechargeable battery to the micro-controller of the emergency management node. An allocation of power to the PoE battery charger is adjusted based on the charge level response to the execution of a charge control algorithm.

DETAILED DESCRIPTION

Figure 1:
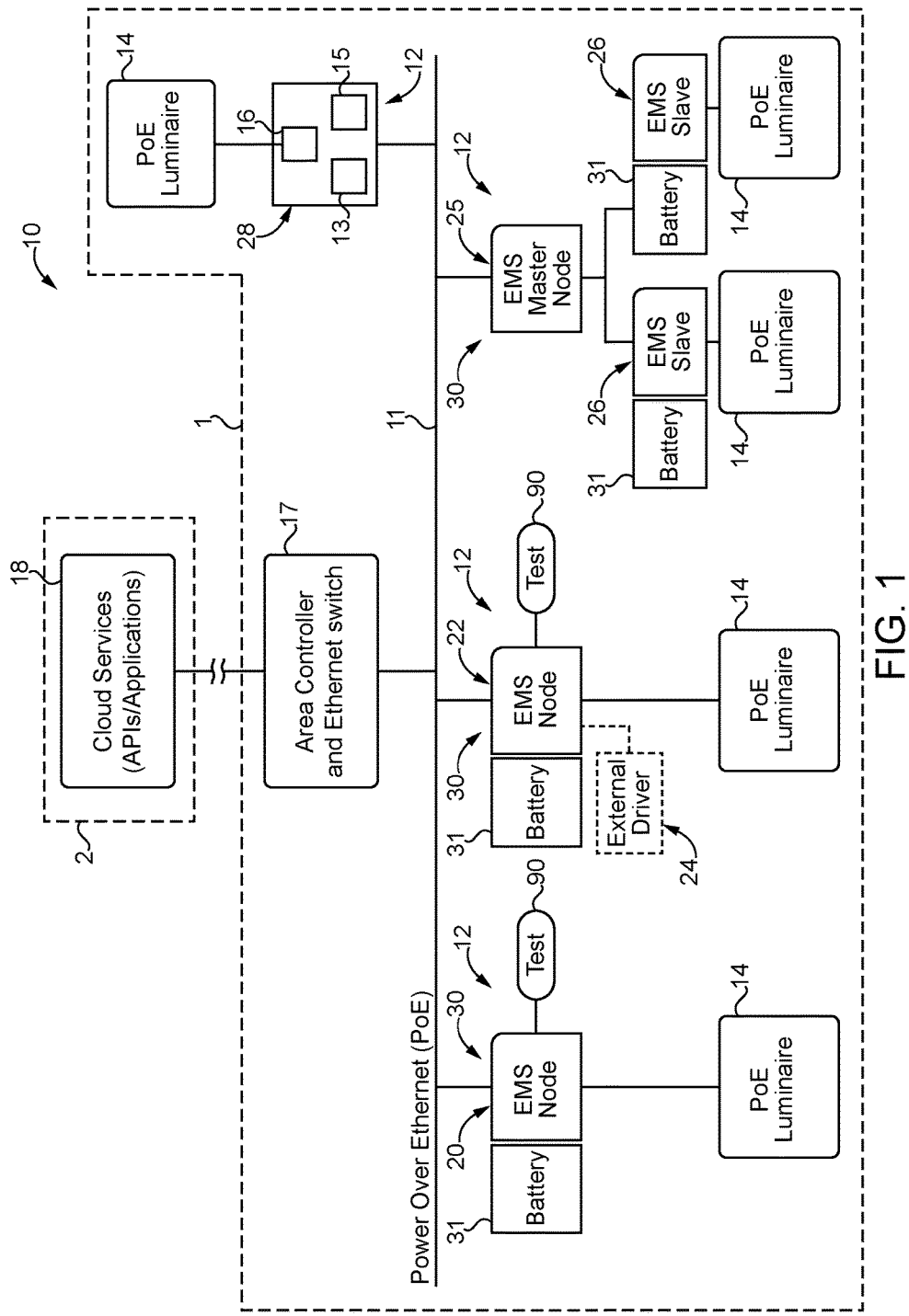
FIG. 1 is a schematic view of a power over ethernet lighting system according to the present disclosure in communication with a remote data storage and processing computer.

Referring initially to FIG. 1, a power over ethernet lighting system 10 includes a plurality of nodes 12 that are electrically connected to a power/communication bus 11 with a power over ethernet (PoE) interface 13. The PoE lighting system 10 may be installed in a first building 1 and be in communication with a remote location 2 that houses a remote data storage and processing computer 18. The remote data storage and processing computer 18 may be considered cloud services for system 10. Although the PoE lighting system 10 would likely have numerous nodes 12, the illustration of FIG. 1 shows a maintained node 28, which may be the most numerous, and a master emergency management services (EMS) node 25 connected to two slave EMS nodes 26. In addition, the illustration shows a dual driver EMS node 22 and a single driver EMS node 20. In a typical installation, the PoE lighting system 10 will include numerous maintained nodes 28, which operate during normal day to day conditions, and a more limited number of EMS nodes 20, 22, 25, 26, 30 to facilitate lighting in the event of a power loss on the power/communication bus 11. Each of the nodes 12 is electrically connected to a PoE luminaire 14. In most instances, the PoE luminaire 14 will include one or more light emitting diode (LED) arrays. However, other electrically powered lights suitable for use with a power over ethernet system would also fall within the intended scope of the present disclosure. Preferably, each of the nodes 12 includes exactly one PoE interface 13. Each of the nodes 12 includes the PoE interface 13, a micro-controller 15 and a driver 16, which may occupy a common circuit board electrically connected to the PoE luminaire 14. In addition, each of the nodes 12 preferably include exactly one micro-controller, but a node board could include two or more micro-controllers without departing from the present disclosure. Each micro-controller is of a conventional design and commercially available to include a central processing unit, memory, software, timers/counters, possibly a real time clock and various analog and/or digital inputs and outputs. At least one of the nodes 12 in the PoE lighting system 10 is an emergency management node 30 that includes a rechargeable battery 31 and a PoE battery charger 32. The micro-controller 15 of each of the emergency management nodes is electrically connected to the rechargeable battery 31. In the illustrated embodiment, the emergency management node(s) 30 may be at least one of the single driver EMS node 20, a dual driver EMS node 22, or a master EMS node 25 coupled to one or more slave EMS nodes 26.

The PoE lighting system 10 has a maintained mode in which the PoE luminaire 14 of each of the nodes 12, including the emergency management node(s) 30, is powered by electricity from the power/communication bus 11 as controlled by the respective micro-controller 15, which is powered by one of the power/communication bus 11 and the rechargeable battery 31. Thus, in the maintained mode, each of the emergency management nodes 30 will be operated according to software stored on its respective micro-controller 15 which may be powered by the respective rechargeable battery 31, even when power exists on the power/communication bus 11. However, the emergency management nodes 30 may be configured such that their respective micro-controllers 15 is powered by the power/communication bus 11 when the bus is powered up, and then switch to their respective rechargeable battery 31 in the event of a power loss on power/communication bus 11. In other instances, the respective micro-controller 15 of the emergency management nodes 30 may be always powered by the rechargeable battery 31, even when power is present on the power/communication bus 11. The power over ethernet lighting system 10 also has an emergency mode characterized by a power loss on the power/communication bus 11. In the emergency mode, the PoE luminaire 14 of the emergency management node 30 is powered by electricity from the respective rechargeable battery 31 as controlled by software stored on the respective micro-controller 15, which is then powered by the respective rechargeable battery 31. The power over ethernet lighting system 10 may include a common area controller and ethernet switch 17 that communicates with both the nodes 12 in building 1, and with the remote data storage and processing computer 18 (the cloud) at the remote location 2. The common area controller and ethernet switch 17 may be electrically connected to the power/communication bus 11. Thus, those with skill in the art will recognize that the PoE lighting system 10 includes emergency management node(s) 30 that essentially operate as maintained nodes during normal power on power/communication bus 11, but also operate as emergency management nodes when there is a power loss on the power/communication bus 11. The different EMS nodes 30 shown in FIG. 1 vary from each other by their source of line power, which may be the power/communication bus 11 or some external AC or DC source, their respective methods of switching between line power and battery power, and the number of connected lights and power distribution.

Each of the plurality of nodes 12 are in communication with the common area controller 17, which is electrically connected to the power/communication bus 11. The common area controller and ethernet switch 17 has an ethernet connection to, and is in communication with, the remote data storage and processing computer 18. Each of the EMS nodes 30 includes hardware in the form of a single circuit board, which may be one of several configurations discussed infra, as well as software that runs on the respective EMS node 30, and additional software that runs on other computing devices, such as the computer at the remote data storage and processing computer 18.

Figure 2:
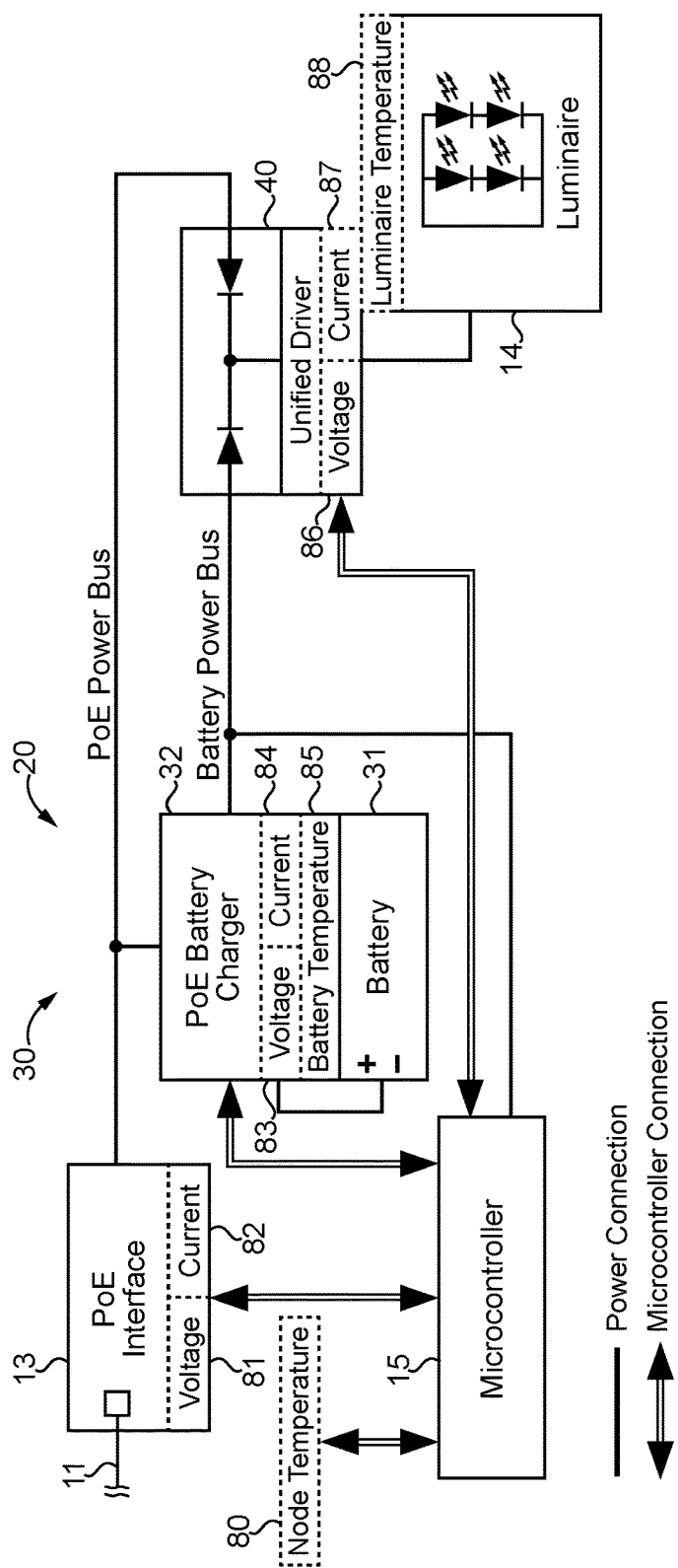
FIG. 2 is a schematic view of a first configuration of an emergency management node for the power over ethernet lighting system of FIG. 1.

Referring now to FIG. 2, an emergency management node 30 in the form of a single driver EMS node 20 is shown in greater detail. A convention used throughout the figures includes a solid line indicating a power connection and a double line that indicates micro-controller connections, such as for communication, sensor inputs and outputs. In the case of single driver EMS node 20, its driver 16 may include a unified PoE/battery driver 40 that switches between providing power to the PoE luminaire 14 from the power/communication bus 11 if power is present, or from the rechargeable battery 31 if there is a power loss on the power/communication bus 11. This may be accomplished without any switching circuitry utilizing opposing diodes as shown. This configuration may represent a cost-sensitive strategy in which the power source for the PoE luminaire 14 is inherently controlled by the unified PoE/battery driver 40 without intelligent control from micro-controller 15. Nevertheless, micro-controller 15 may be configured to monitor node temperature 80, voltage 81 at the PoE interface, current 82 in PoE interface 13, along with voltage 83 of battery 31, current 84 of battery 31 as well as battery temperature 85. In addition, micro-controller 15 may monitor voltage 86 and current 87 at unified driver 40, as well as the temperature 88 of the luminaire 14. This information may be stored in memory available to, or a part of, micro-controller 15, and communicated to the common area controller 17 which may make the information continuously available to the remote data storage and processing computer 18. Those skilled in the art will appreciate that the features 80/88 may represent conventional voltage, current or temperature sensors of a type well known in the art. Thus, the driver 16 of the single driver EMS node 20 is the unified PoE/battery driver 40, which is electrically connected to the PoE interface 13 with a first electrical connection 41, and electrically connected to the rechargeable battery 31 by a second electrical connection 42.

Figure 3:
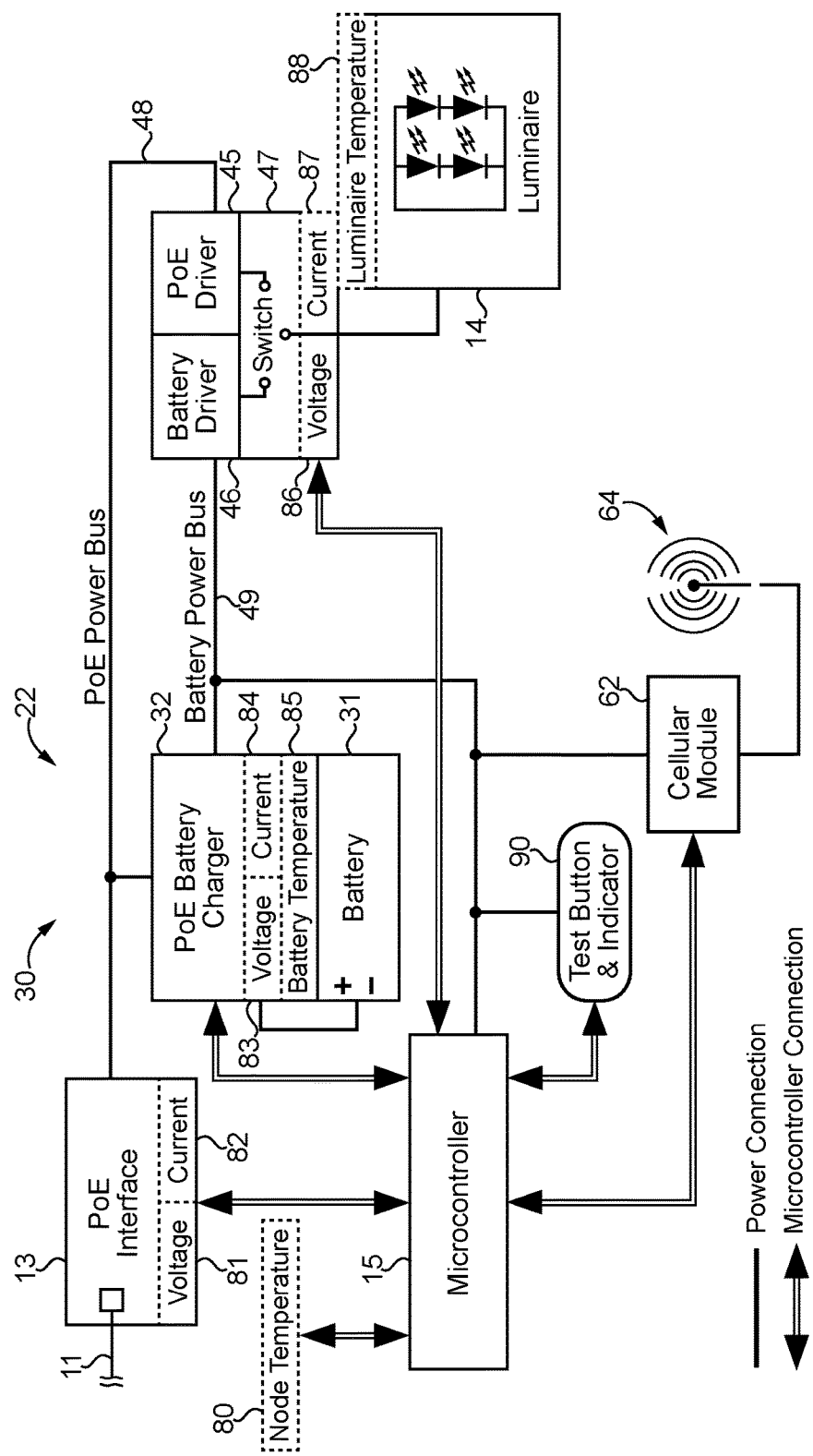
FIG. 3 is a schematic view of a second configuration for an emergency management node for the system of FIG. 1.

Referring now to FIG. 3, an emergency management node 30 may be configured as a dual driver EMS node 22. This alternative configuration may share all of the sensor 80-88 features discussed in relation to the single driver EMS node 20 of FIG. 2, but it differs in that the driver 16 includes both a PoE driver 45 and a battery driver 46 as well as a output switch 47. The PoE driver 45 is electrically connected to the PoE interface 13 via a first electrical connection 48, and the battery driver 46 is electrically connected to the rechargeable battery 31 by a second electrical connection 49. The output switch 47 is electrically connected to the PoE luminaire 14. The micro-controller 15 is in control communication with the output switch 47 to control the position of the switch based upon the presence, or lack thereof, of power on power/communication bus 11 as determined by micro-controller 15 by voltage and/or current data (81, 82) communicated to the micro-controller 15 from PoE interface 13. The dual driver EMS node 22 uses PoE as its primary line power, and like the configuration of FIG. 2, it changes over to battery power running off the attached rechargeable battery 31 when PoE fails. Unlike the configuration of FIG. 2, the dual driver EMS node 22 contains separate driver circuits for running on line power (PoE driver 45) and battery power (battery driver 46), and includes an automatic switching circuit that detects power failure and switches between the two sources as needed and as controlled by micro-controller 15. The extra circuitry of the dual driver EMS node 22 may provide greater reliability over the configuration of FIG. 2, probably at a greater cost, and is intended for applications with a greater reliability demand.

FIG. 3 is also of interest for showing that each EMS node 30 may include a test button and indicator 90 that is a familiar feature to most emergency lighting systems. The micro-controller 15 may be configured to change the output switch 47 from the PoE driver 45 to the battery driver 46 responsive to the test button 90 being pressed in a conventional manner. Micro-controller 15 may also store the timing and duration of a test responsive to the test button 90 being pressed, and may communicate that information to the remote data storage and processing computer 18 in due course. Those skilled in the art will appreciate that building codes may require each EMS node 30 to include a test button 90. Thus, an individual conducting a test may observe the luminaire 14 briefly going out and then relighting responsive to the output switch 47 changing from the PoE driver 45 to the battery driver 46. The micro-controller 15 of each emergency management node 30 may be configured to control the PoE luminaire 14 at a first level with power from the power/communication bus 11, and at a second level, which is different from the first level, with power from the rechargeable battery 31. For instance, the individual luminaires 14 may be configured to give off greater light when being operated in a maintained mode, but operate in a dimmer lower light level when operated in an emergency mode. Nevertheless, those two lighting levels could be the same without departing from the present disclosure.

FIG. 3 is also of interest for showing an emergency management node 30 with an optional cellular module 62 that is configured to establish a communication link with a wireless cellular network 64. The micro-controller 15 is in control communication with the cellular module 62. The micro-controller 15 may be configured to activate the cellular module responsive to a power failure on the power/communication bus 11, and communicate any stored or ongoing event data or other information to an intended recipient connected to the cellular module 62 over the wireless cellular network 64. For instance, the cellular module 62 may facilitate real time power failure notifications and/or may notify the remote data storage and processing computer 18 of a power failure. A programmable notification may then be sent to various users and responsible parties associated with PoE lighting system 10. The cellular module 62 may be connected to the EMS node 30 using its communication bus as well as connected to the commercial cellular network 64. The cellular module may be powered by the rechargeable battery 31. This solution may solve a problem of differentiating between a loss of communication with a node (or an entire site via the common are controller 17) due to loss of power or loss of communication due to an interruption in the normal ethernet-based communications path.

Figure 4:
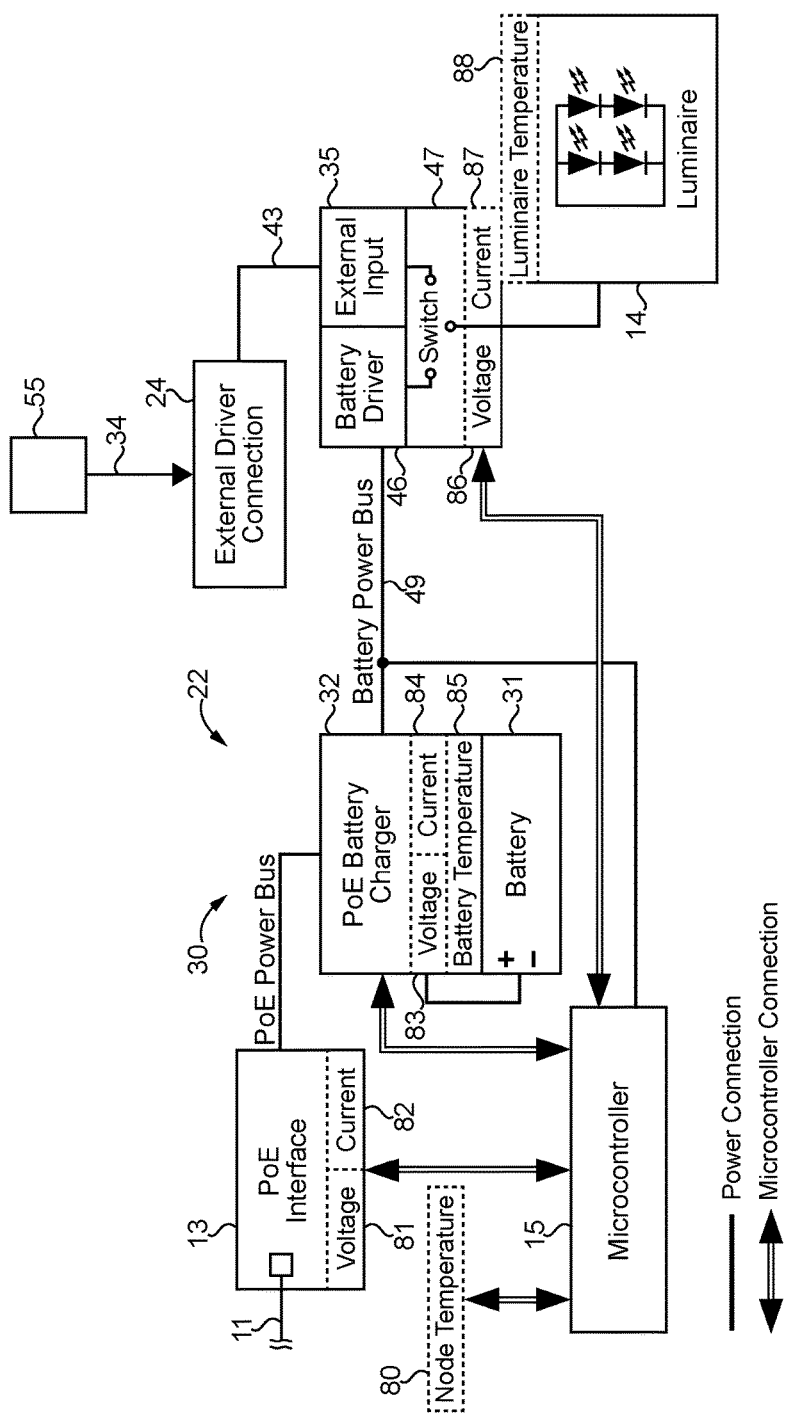
FIG. 4 is a schematic view of a third configuration for an emergency management node for the system of FIG. 1.

Referring now in addition to FIG. 4, there are many cases where users may want to keep their existing lighting infrastructure, but also want intelligent monitoring and battery maintenance and testing. FIG. 4 shows an alternative dual driver EMS node 22 with a similar auto switching configuration of FIG. 3, except that the driver 16 includes an external input driver 35 that is connected to an external driver connection 24 by a separate electrical connection 43, rather than being connected to the power/communication bus 11 as in the FIG. 3 configuration. The external driver connection 24 may be connected to an external power source 55 by an external power bus 34 in a conventional manner. External power source 55 may be AC or DC. Thus, the external input 35 may be considered as an external PoE driver 54 according to the present disclosure. The configuration in FIG. 4 powers the luminaire 14 from the external power source 55, but when this power source fails, the micro-controller 15 automatically changes the output switch 47 to power the luminaire 14 via the battery driver 46. As stated earlier, the external power source 55 is likely different from the power/communication bus 11. Like the previous configuration, the micro-controller 15 is in control communication with the output switch 47.

Figure 5:
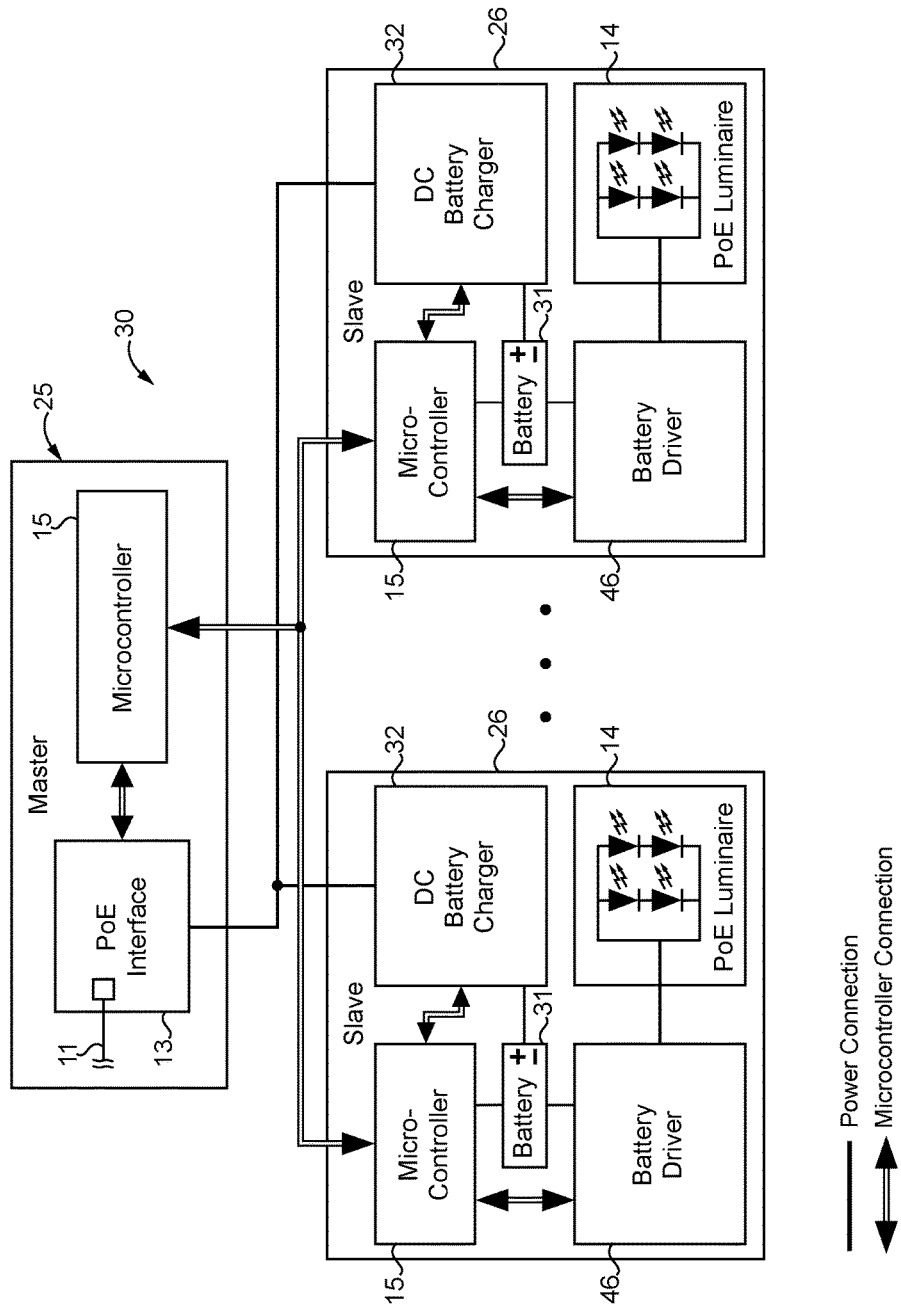
FIG. 5 is a schematic view of a master/slave emergency management node for the system of FIG. 1.

The EMS nodes 20 and 22 of FIGS. 2-3 are capable of providing significant power to their respective luminaires 14, which may be far more than is needed. For example, emergency exit signs require only low power for illumination. Referring to FIG. 5, these applications that include one or more low power lighting (e.g., emergency exit signs) may be suitable for the configuration shown in FIG. 5 in which a single master EMS node 25, which does not include a battery, provides communication and power for an arbitrary number of likely lower power demand slave EMS nodes 26. Thus, the master EMS node 25 includes the PoE interface 13 which is electrically connected to the power/communication bus 11 and a micro-controller 15 that is in control communication with the respective micro-controllers 15 associated with each of the slave EMS nodes 26. In addition, the slave EMS nodes 26 may be electrically connected to a shared PoE power bus 33 that is electrically connected to the power/communication bus 11 via the PoE interface 13 of master EMS node 25. Each of the slave EMS nodes 26 includes a micro-controller 15, a rechargeable batter 31, a DC battery charger 32 and a battery driver 46 that is electrically connected to an individual PoE luminaire 14, which may constitute a single LED light or a whole array. Although not shown, the individual micro-controllers 15 of the individual slave EMS nodes 26 may include some or all of the full array of sensors 80-88 discussed earlier with regard to the other EMS nodes 30.

Both under software control and when a power outage occurs, the EMS nodes 30 change seamlessly from line power (PoE line power in the configurations of FIGS. 2, 3 and 5 or foreign power in FIG. 4) to battery power. Under battery power, the EMS node 30 luminaire 14 is maintained for a period of time at a programmable level as per instructions stored on memory of the respective micro-controller 15. The programmable level may be different from the light's programmed maximum level on line power. For example, if a luminaire 14 is a maintained light, its programmed emergency level may be substantially lower than its normal level in order to maximize the duration in which the light can be kept on relying upon battery power alone. At minimum, the emergency level may be capable of meeting building code requirements for emergency lights. When on battery power, the micro-controller 15 may be programmed to continuously adjust its output to maintain the light at a programmed level. After some period of time, some preprogrammed intelligent level adjustments may be made to maximize the additional time the light may be able to be kept powered using the remaining battery charge without causing undo battery wear. In other words, the micro-controller 15 may be configured to adjust the power level supplied by the battery responsive to a condition of the rechargeable battery. That condition of the battery may be an estimated remaining life span or other factors including but not limited to a current discharge rate from the battery, etc. Examples of such intelligent adjustments to power level supplied by the battery to the luminaire 14 include timer based cutoffs and calculated run down based on programmed priority or measurement.

One emerging focus in EMS systems is the ability to provide centralized, accurate and timely information about the state of luminaires 14, batteries 31 and other components based upon information gathered by the various sensors 80-88 identified earlier. Users often want to know that their EMS lighting system is fully functional at any given time, that it has been regularly tested and shown to perform as expected, and that no component failures are imminent. Meeting these expectations involves monitoring, testing and making predictions. Thus, micro-controllers 15 for power over ethernet lighting systems 10 according to the present disclosure may be configured to communicate battery condition data to the power/communication bus 11. The common area controller 17 can then communicate that information to the remote data storage and processing computer 18 for updating and maintaining a history of each individual node in order to predict readiness and other relevant aspects of the system. In general, software on the micro-controller 15 of each EMS node 30 continuously monitors a variety of mostly battery related information, including but not limited to battery current, battery voltage, battery temperature, line current, line voltage, node temperature, battery state (e.g., charging, discharging, or on-line), and a variety of events. These events can include but are not limited to timing and duration of a test button press, scheduled battery tests, scheduled battery full discharge, override battery tests, override battery full discharge, line power lost timing and duration, timing of line power restoration, battery depletion information and EMS light level changes (e.g., programmed level for when battery power is on). The emergency management node 30 in general, and the micro-controller 15 in particular, includes a memory in communication with or a part of the micro-controller 15. The micro-controller 15 is configured to store the battery condition data to the memory when the rechargeable battery is powering the PoE luminaire 14 of the emergency management node 30. Although other information could be considered battery condition data, at a minimum, battery condition data may include battery current, battery voltage, battery temperature and battery operation state at any given time. When able to communicate with the remote data storage and processing computer 18, the EMS node 30 may upload all monitored information. When no such communication is possible, such as for example when PoE power and communications are unavailable, the monitored information may be temporarily saved on the memory of the EMS node 30, and then uploaded once communication is restored. This strategy provides gapless monitoring of the EMS information during power outages of limited duration. Monitored information stored in the remote data storage and processing computer 18 may be analyzed to provide users with valuable information such as a state of health value regarding a given rechargeable battery 31. In addition to communicating battery condition data, the micro-controller 15 may be configured to communicate event data to the power/communication bus 11 which may then be communicated to the remote data storage and processing computer 18 for further evaluation. Event data according to the present disclosure includes, but is not limited to time stamps relating to test commands, line power loss and duration and line power restoration timing.

Various compliance codes require periodic (often monthly) testing of emergency service lighting. Typically this is done by someone (e.g., a fire inspector) walking around a building that has EMS lighting pressing a test button connected to each EMS light, and determine and document that the system switches to battery power and that the EMS light is turned on responsive to pressing the test button. Some compliance codes also require less frequent battery capacity testing, usually on a yearly basis. In such a capacity test, the power over ethernet lighting system 10 is switched from line power to battery power responsive to a command communicated over the power/communication bus 11, and maintains the luminaires 14 on for some period of time (e.g., 90 minutes), and then recharges the battery to functional capacity within maybe 24 hours. With current industry standard solutions, this task is much more difficult to verify, as testing personnel may need to be present at various times over the course of more than 24 hours. The present disclosure solves this problem by providing automatic, scheduled testing with verifiable tracked results responsive to test commands communicated over the power/communication bus 11 and data gathered by the various sensors 80-88 during the test to verify, record and document compliance. Software operating on the micro-controller 15 of each EMS node 30 supports programmable scheduling for both functional and capacity testing. Both tests can be performed manually, overriding the programmed schedule. A functional test can be manually triggered through software or by pressing the test button 90 associated with a given EMS node 30. A capacity test can be triggered manually through software or by performing a pre-programmed sequence of timed presses of the test button. If a manual test has been performed during a test schedule (e.g., a functional test has already been run this week) and the system has collected its results, then the scheduled test may be skipped, if the micro-controller 15 is so configured. For each functional and/or capacity test, the PoE ethernet lighting system 10 generates a record, including but not limited to information such as time stamp of the test, duration of the entire test, battery discharge information, charging information when appropriate, and maybe an estimated battery life remaining at the end of the test. Discharge information may include duration of discharge portion during the test, battery current, voltage temperature measured at intervals during the test, and the light level for the luminaire 14 recorded at intervals during the test. Charging information may include the duration of the charging portion of the test, battery current, voltage and temperature measured at intervals during the test, and maybe estimated percent battery charged and estimated battery life, calculated for various times during the test. Because much of this information is stored at the remote location 18, users may be able to generate and view all testing history reports for the entire lifetime of a single EMS node 30 and its associated luminaire 14, for multiple EMS nodes 30 and associated luminaires grouped in an identified zone, or respectively defined groups of zones and lights (for example, an entire building site, or collection of EMS lights across sites).

In addition to accessing node histories and testing reports and other information, users may want to be notified immediately whenever various predetermined conditions arise. For example, a user responsible for managing multiple sites may want to know immediately of power failures at one or more of them so that a suitable manager can be contacted to attend to the problem. Such notifications may be sent from the remote data storage and processing computer 18, and may take the form of text messages, emails, or other mechanisms, such as internet or web-based protocols.

When a power failure event occurs, ethernet communication with the EMS nodes 30 is typically lost. Upon restoration of power, in addition to its normal ongoing monitoring, the EMS node 30 may upload all information captured during the power failure as described above. If the duration of the loss of power was greater than a programmable time period, resulting to total power loss, it may be that only the initial period of monitored data is preserved. Under normal operation, when operating with line power, the EMS node 30 sends periodic monitoring data to the remote data and storage processing computer 18. The collected data may be used to provide the following programmable user notifications: A power restoration event notifies users that power has been lost and has not been restored. A battery temperature warning notifies users that a battery temperature is outside of a configurable range, and may include the duration of the temperature deviation. Battery life warning may notify users that a certain identifiable battery 31 is below a configurable percent of its remaining expected life. Thus, one could expect each component of each EMS node to have an identifiable unique ID to differentiate each component from among the many components in a given building site. A battery life rate warning may notify users that the rate of battery life decay for a certain battery 31 over a configurable life span of time, as that the battery is predicted to not last the configurable or desired span of time. For example, a five year old battery's life may have dropped over the previous 10 months such that it can no longer be expected to have a total life span of 7 years. Industry standard regression estimation techniques may be used for this determination.

Figure 6:
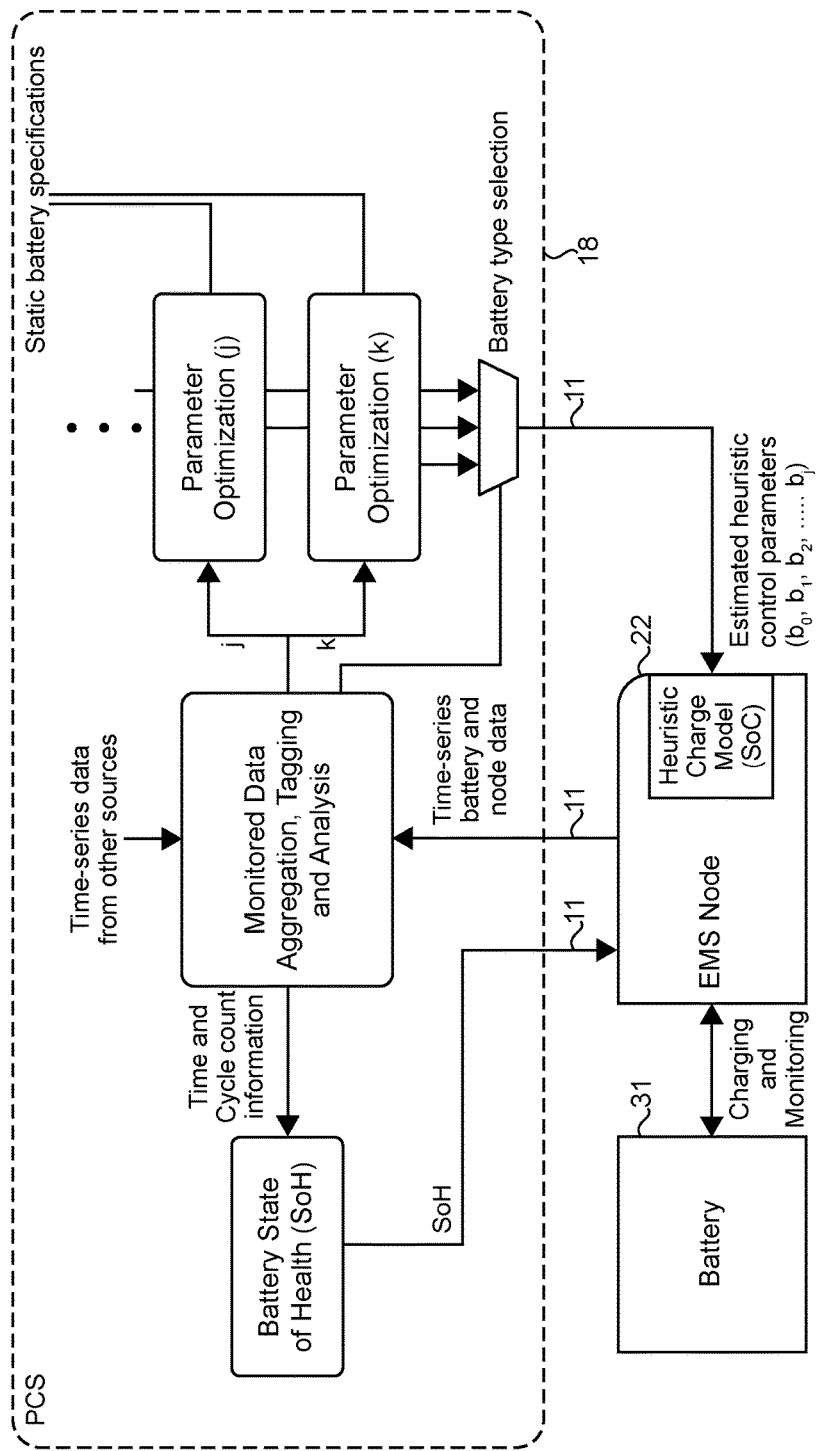
FIG. 6 is a schematic view of battery condition determination at a remote data storage processing computer according to the present disclosure.

Referring now in addition to FIG. 6, the EMS node 30 derives at least two primary metrics used to manage a battery's life span. These include state of charge (SoC) and a state of health (SoH) value. Both of these variables may be normalized to be assigned a value between 0 and 1. FIG. 6 shows an overall method for determining at a given EMS nodes 30 SoC. It is known that batteries with different chemistries and materials differ in their charge and discharge characteristics, and in their tolerance to charging and temperature extremes. For example, nickel cadmium batteries are less sensitive to overcharging than lithium ion batteries. In general, an EMS node may do nothing to recognize what kind of battery it is connected to. Instead, and as discussed above, the EMS node 30 may continuously collect various time-series battery information-voltage, current, temperature, and so on—which are eventually uploaded for evaluation to the remote data and storage processing computer 18.

Based on information collected at each EMS node 30 (e.g., charge and discharge information, temperature) standard classification methods may be used to identify the kind of battery attached to each node 30. This function may be called monitored data aggregation tagging and analysis in FIG. 6, and may apply a tag to each data measurement indicating the battery type. Each set of tagged monitoring data may then be fed, along with any relevant manufacturers information, into a process that optimizes battery charge parameters for that type of battery. For example, all monitoring data for battery type (k) in FIG. 6 is sent to the block labeled parameter optimization (k), and each of these optimization blocks may then produce a set of optimized heuristic charge constants, $b_0, b_1, b_2, \ldots, b_i$ that are periodically sent to all nodes 30 with the corresponding battery type. On the EMS node 30, a heuristic charge model process uses the charge constant provided by the remote data storage and processing computer 18 to govern battery charging processes, and generating an online state of health value for the battery. An example algorithm of the heuristic charge model uses the linear model (Ehret, Pillar, Schorer, Jossen 2000) that derives the state of charge at the current time stamp as a linear function of the state of charge at the previous time step and the current (measured) battery voltage and current. Using this process, the EMS node 30 does not need to be configured for its connected battery, although a battery's specific configuration, which supersedes the calculated charge constant may also be specified. Additionally, the battery can be serviced or even replaced without servicing or reconfiguring the EMS node 30.

A battery's state of health value is a predicted measure of how much expected life the battery has left before it needs to be replaced. Unlike state of charge, which can be approximated or measured via proxy, state of health is by definition a predicted and estimated value. This estimation may be performed wholly on the remote data storage and processing computer 18, and is primarily based upon battery history data and previous experience with a given battery 31. In FIG. 6, the monitored data aggregation, tagging and analysis process produces for each battery connected to an EMS node 30 several metrics as the result of analyzing recording charge and discharge data, as well as data supplied by battery manufactures. Some of these metrics are battery type, battery age, manufacturers specified range of lifetime charge cycles, number of charge cycles, temperature stress rating for each charge and discharge cycle, and quality rating of each charge cycle, which may be based upon the time taken to recharge the battery 31. The battery state of health block computes a weighted average of each of these factors producing a unitless normalized state of health value, which is periodically sent to the corresponding EMS node 30 for storing in the memory of the micro-controller 15. Thus, the remote data storage and processing computer 18 is configured to determine a battery's state of health value for the rechargeable battery 31 of the emergency management node 30 based upon node history data stored in the remote data storage. In addition, the remote processing computer 18 may be configured to identify a battery type of the rechargeable battery 31 based upon node history data stored in the remote data storage. In general, the present disclosure contemplates a closed loop battery recharging strategy that powers the PoE battery charger responsive to a sensed charge level of the battery. One could expect the power supplied to the battery charger to decrease as the charge level of the battery increases.

Figure 7:
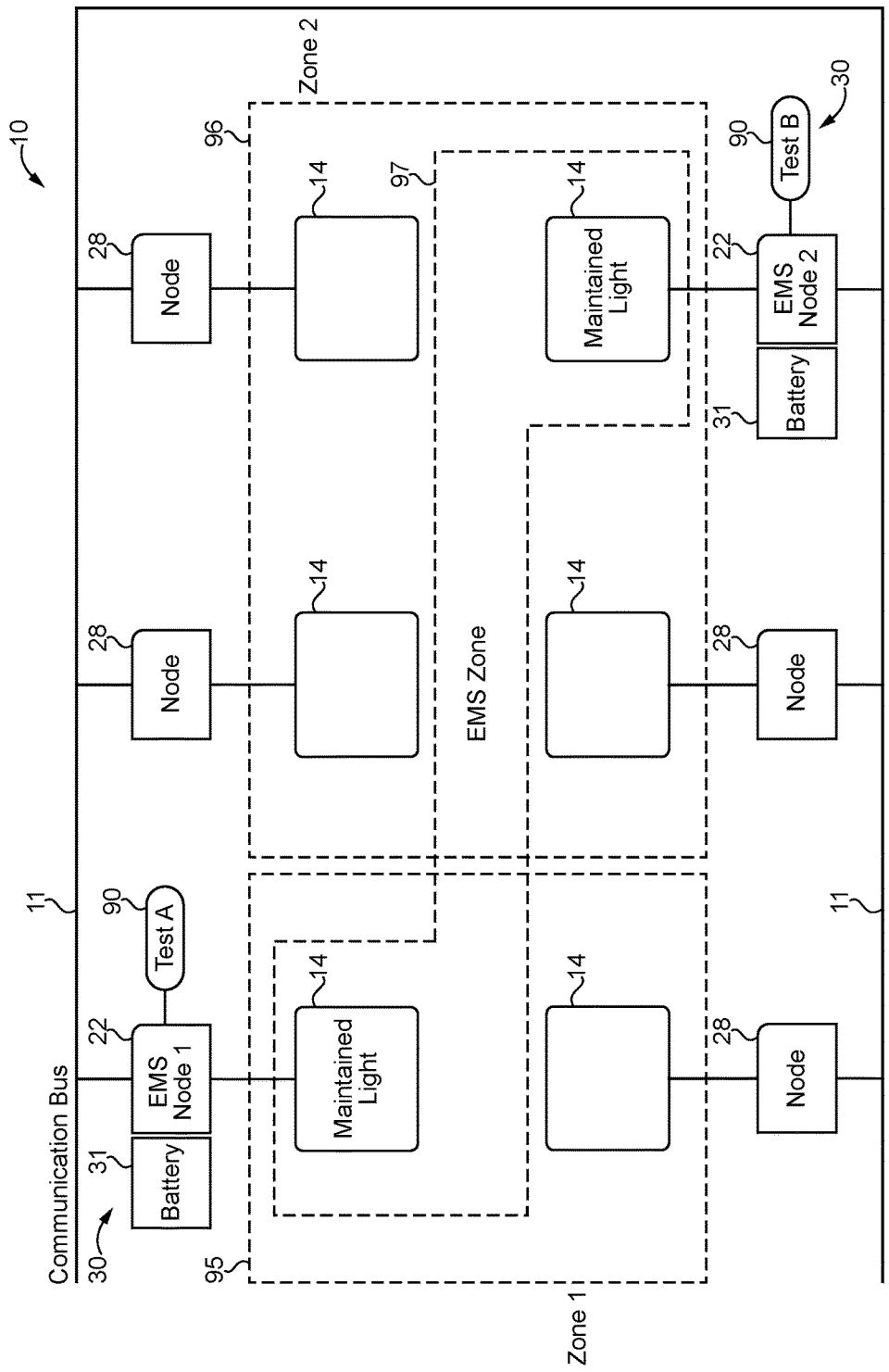
FIG. 7 is a schematic view of a power over ethernet lighting system showing a zone aspect of the present disclosure.

Referring now to FIG. 7, when an EMS luminaire 14 is configured as a dedicated EMS light, for the purpose of configuration and management it is treated as a single emergency light device. However, when the EMS luminaire 14 is configured to also operate as a maintained light, it is treated as two separate devices, as an emergency light device and as a non-emergency light device. For a maintained light, settings that pertained to the light when operating on line power are configured on the non-emergency light device; these devices are treated much the same as any other non-emergency light device associated with any of the maintained nodes 28. In contrast, settings that pertain to the light when on battery power are configured on the emergency light device (e.g., minimum/maximum light level etc.). Regardless of their location and to which node they are connected, EMS nodes 30 and their associated emergency light devices (luminaires 14) can be grouped together into logical zones. Zones may provide a way for users to set common configuration parameters and settings. For example, in FIG. 7, setting a temperature alarm for an EMS zone 97 applies the alarm to both lights in that zone. In particular, FIG. 7 shows a power over ethernet lighting system 10 that includes both maintained nodes 28 and their associated luminaires 14 along with two EMS nodes 30 and their associated test buttons 90. When operating in a maintained mode, there is a Zone 1 (95) that includes one maintained node 28 and one of the EMS nodes 30, and a Zone 2 (96) that includes three maintained nodes 28 and the other EMS node 30. Users can treat these different maintained zones with like programming and similar lighting levels. However, in the event of a power loss, a single EMS zone 97 includes both of the EMS nodes 30 from the respective maintained Zones 1 and 2. Beyond device configuration, multiple EMS nodes 30 in a given EMS zone 97 can be coordinated in testing and monitoring. For example, in FIG. 7 when someone presses the test button 90 connected to one of the EMS nodes 30, all other emergency lights in the EMS zone 97 switch to battery power. The same would happen if one were to press the test button 90 at the other EMS node 30 in the same EMS zone 97. Thus, the micro-controller 15 associated with a first emergency management node 30 is configured to communicate test button pressed data to the power/communication bus 11 responsive to the test button 90 being pressed. The micro-controller 15 of a second emergency management node 30 is configured to power the PoE luminaire 14 of the second emergency management node 30 from the rechargeable battery 31 of the second emergency management node 30 responsive to the test button pressed data from the first emergency management node 30. In a similar manner, scheduled or manual testing as described previously can effect an entire EMS zone 97. This may greatly streamline the process of manually testing EMS lights.

Figure 16:
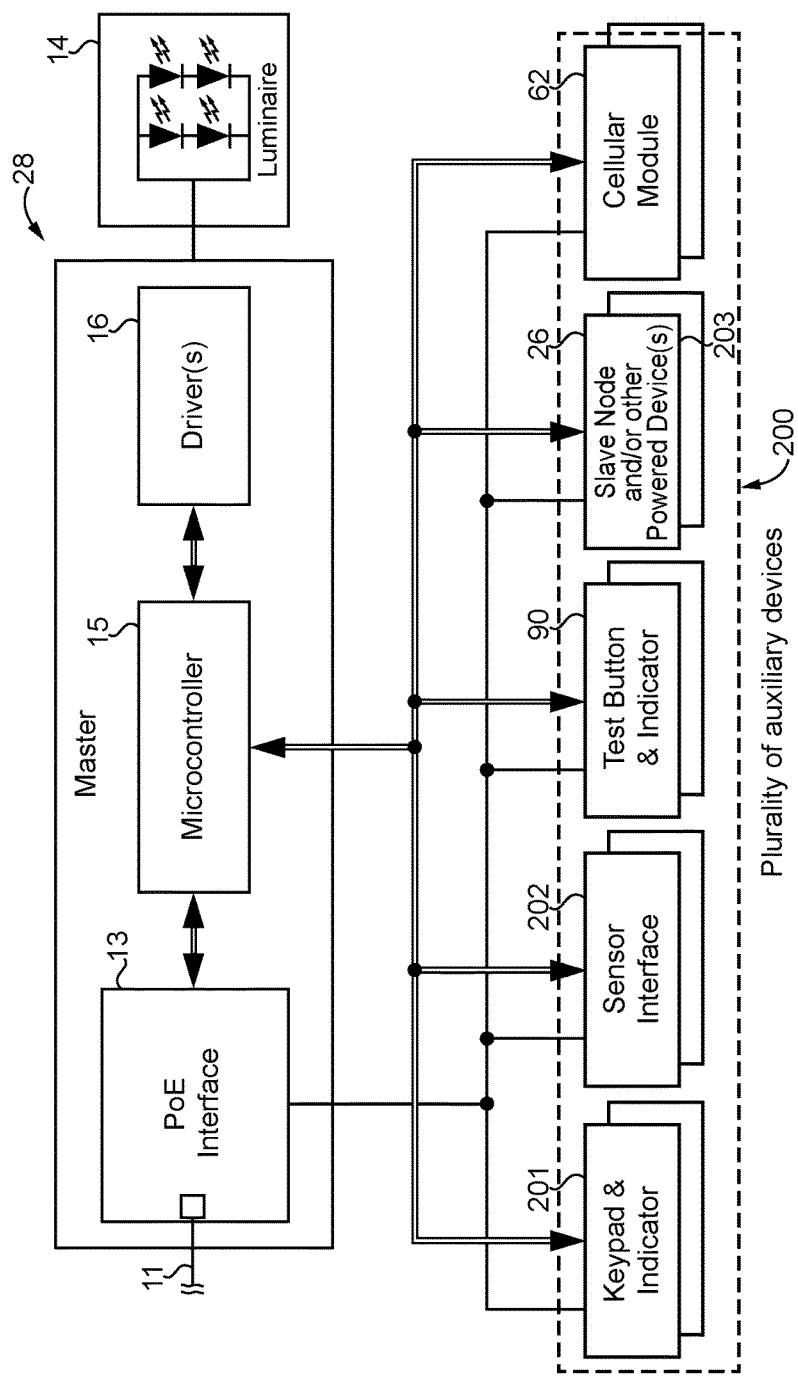
FIG. 16 is a schematic view of a master node according to the present disclosure that includes a plurality of powered auxiliary devices.

Referring now to FIG. 16, a maintained master node 28 according to another aspect of the present disclosure includes several of the features described earlier including a PoE interface is connected to the power/communication bus 11. In addition, node 28 includes a micro-controller 15 in control communication with both the PoE interface 13 and the driver 16 electrically connected to luminaire 14. This Fig. is also included to make clear that a power over ethernet lighting system according to the present disclosure can include numerous powered auxiliary devices 200 that in some way contribute to the overall operation of the system. FIG. 16 shows as example a keypad and indicator 201, a sensor interface 202, a test button and indicator 90, a slave node 26 that itself may include other power devices 203, and a cellular module 62. A non-exhaustive list of powered auxiliary devices includes, but is not limited to Touch Screen Control Display Panels, Bluetooth Interfaces, Zigby Interfaces, Zwave Interfaces, Wifi Interfaces, Lifi Interfaces, RFID Interfaces, Logic/Contact Input/Output Interfaces, Analog Input/Output Interfaces, Enumeration/Status Indicators, Audio Microphone/Sound Processing Components, Audio Speaker/Sirens, Strobe Lights, CO, $CO_2$, $O_2$, RH, Temperature, Air Flow Rate Sensors, Daylight, Position, etc. Sensors, Video, Thermal Imaging, Badge Readers, Electronic Door Locks, Serial Interfaces, and numerous other components known to those skilled in the art. The present disclosure contemplates a strategy in which the individual micro-controller 15 for each individual node manages the power supplied, if any, for the various powered devices in control communication with the respective micro-controller 15. The present disclosure also includes systems that include one or more power devices that are electrically connected to the power/communication bus 11, but may not include other features typical of the maintained and emergency nodes described herein. In most circumstances, the power sourcing equipment or area controller ethernet switch 17 (FIG. 1), can distribute sufficient power to all nodes such that all the various powered devices 200 can be powered at a desired level simultaneously. However, the present disclosure also contemplates circumstances in which the currently available power is less than that necessary to fully power all powered devices at that time. Thus, the present disclosure contemplates a system having the ability to prioritize allocation of currently available power to devices and subsystems, and possibly negotiate with the ethernet switch 17 (FIG. 1) which could be a mid-span device, for a power grant that is less than a desired power requested by the individual node to power all of its associated devices 200 at a desired power level at a given time. The present disclosure addresses these problems by dynamically negotiating only the power that the PoE end point needs at any given time, and by insuring that, on the end point, power is appropriately allocated to its subsystems and other powered devices.

Efficient use of power over ethernet resources requires that multiple devices and subsystems be powered from a single PoE port (e.g. lights, sensors, controllers, microprocessors, battery charge systems, etc.). Power requirements for these devices and subsystems is dynamic. So a system that simply allocates a fixed power budget to each ethernet port may, in some cases, be too generous, and in other cases allocate too little power. Even worse, in some instances, a port's allocated power may be sufficient at an outset, but insufficient later on as the power needs of the devices changes over time. The present disclosure contemplates a system in which the individual micro-controller 15 of each node continuously inventories and prioritizes the allocation of power to all of its attached power devices 200 and subsystems, such as driver 16 and luminaire 14. This strategy may be carried out conceptually by collecting the power requirements and various components associated with node 28, allocating power among those devices according to a stored prioritization schedule, and continuously negotiating with the power sourcing equipment (e.g. ethernet switch 17) for a desired power level to meet all dynamic power requirements. For instance, each emergency node 30 according to the present disclosure may include a dynamic power allocation algorithm configurable to prioritize an allocation of power to the PoE battery charger over the driver 16 electrically connected to the PoE luminaire 14 in the maintained mode, and prioritize the allocation of power to the driver 16 connected to the PoE luminaire 14 in the emergency mode. Nevertheless, the prioritization of power allocation may be set by a user input configuration that deviates from possibly preset default values. For instance, the dynamic power allocation algorithm may be configured to set a relative power prioritization among the PoE battery charger and the driver 16 electrically connected to the PoE luminaire 14 responsive to a user input configuration, which could actually prioritize the driver 16 electrically connected to the PoE luminaire 14 over that of the battery charger. As a default, the present disclosure contemplates prioritizing the PoE battery charger over powering the luminaire 14. Thus, in a default situation that might occur after a power loss on the power/communication bus 11, the system may dim the luminaire 14 in order to provide full power to a battery charger of an emergency node 30 immediately after a power loss event. During the actual power loss, the dynamic power allocation algorithm may be configured to allocate no power to the auxiliary power devices 200 in the emergency mode. Immediately after the power loss event, the dynamic power allocation algorithm may be configured to power the PoE luminaire 14 at a reduced power level and the battery charger 32 (FIG. 4) at a full power level when the emergency management node 30 receives a power grant from the power supply equipment (switch 17, FIG. 1) that is inadequate to fully power both the PoE luminaire 14 and the battery charger 32. In practice, the micro-controller 15 of each node 28, 30 may include a power request algorithm that is a portion of the power allocation algorithm. The power request algorithm may be configured to determine a desired power level for each powered device 200 of the respective node 28, 30, and determine a requested power level based upon a sum of the desired power levels. This requested power level may then be communicated to the power sourcing equipment (e.g., switch 17, FIG. 1) electrically connected to the power/communication bus 11. The dynamic power allocation algorithm may be configured to receive a confirmation communication from the power sourcing equipment that the requested power level was received. The dynamic power allocation algorithm also may be configured to received a power level allocation, which is less than or equal to the requested power level from the power sourcing equipment. The power sourcing equipment (e.g., switch 17, FIG. 1) may include a prioritization algorithm configured to prioritize power allocation to the emergency management node(s) 30 over at least one of the plurality of nodes (e.g. maintained nodes), that is not an emergency management node. This aspect of the disclosure can come into play when there is inadequate power to meet all the requested power needs of all the individual nodes, such as immediately after a power loss event where power may be allocated more in favor of recharging batteries of emergency nodes 30 over fully powering luminaires and/or other power devices 200 distributed throughout the system.

INDUSTRIAL APPLICABILITY

The present disclosure finds general applicability to lighting systems for buildings. The present disclosure finds particular applicability to buildings utilizing power over ethernet lighting systems that must include emergency management services to maintain some level of emergency lighting during a power loss.

Figure 8:
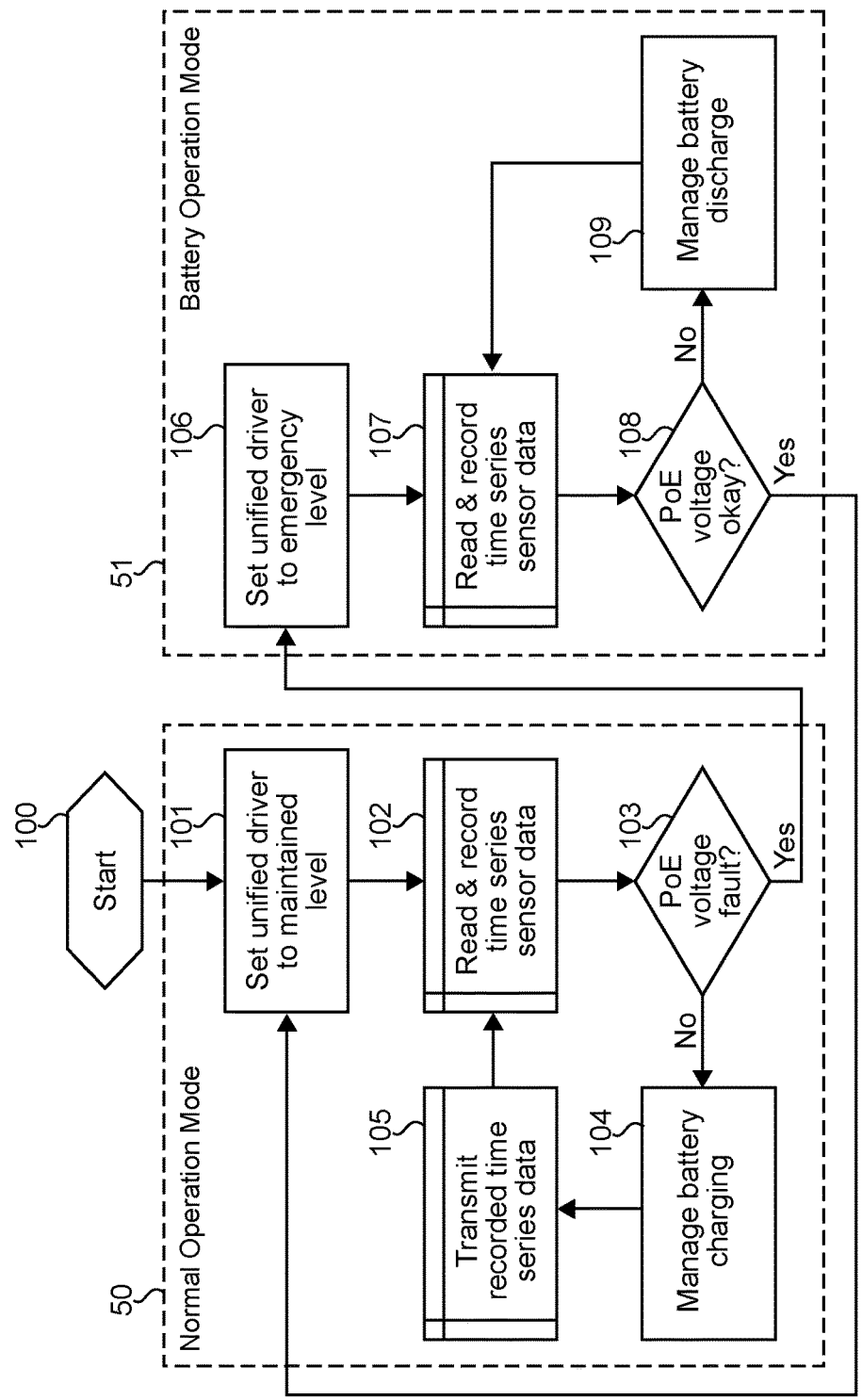
FIG. 8 is a logic flow diagram for operation of the emergency management node of FIG. 2.

Referring now in addition to FIG. 8, the logic flow diagram for some of the software executed by micro-controller 15 of the configuration shown in FIG. 2 is illustrated. In particular, and as discussed previously, each emergency management node 30 in general, and each single driver EMS node 20 in particular may be operated and either a maintained mode 50 or an emergency mode 51. The logic begins at start 100 and proceeds to block 101 where the unified driver 40 is set to a maintained level for operating luminaire 14. Next, at block 102, time series sensor data is read and stored based upon information from the sensors 80-88 discussed previously. Next, at query 103, there is a determination of whether there is a PoE voltage fault, such as associated with a power loss on the power/communication bus 11. If the answer is no, then the battery charging is managed at block 104. At block 105, the recorded time series data is transmitted to the power/communication bus 11, which may then be communicated to the common area controller 17 and then onto the remote data storage and processing computer 18. If the answer to query 103 is yes, then the EMS node 30 changes to the emergency mode 51 at block 106 to set the unified driver 40 to an emergency level, which may likely be a different and lower level from the maintained lighting level. At box 107, time series sensor data is again read and recorded. At query 108, there is a determination of whether the power loss event is over and that power is again available on the power/communication bus 11. If the answer is no, at block 109, the battery discharge is managed. Thereafter, the logic returns to block 107 to read and record the time series sensor data and again execute the query 108. Eventually, when the power is resumed, the answer to query 108 is yes and the logic again returns to block 101 to reset the unified driver 40 to the maintained level for luminaire 14.

Figure 9:
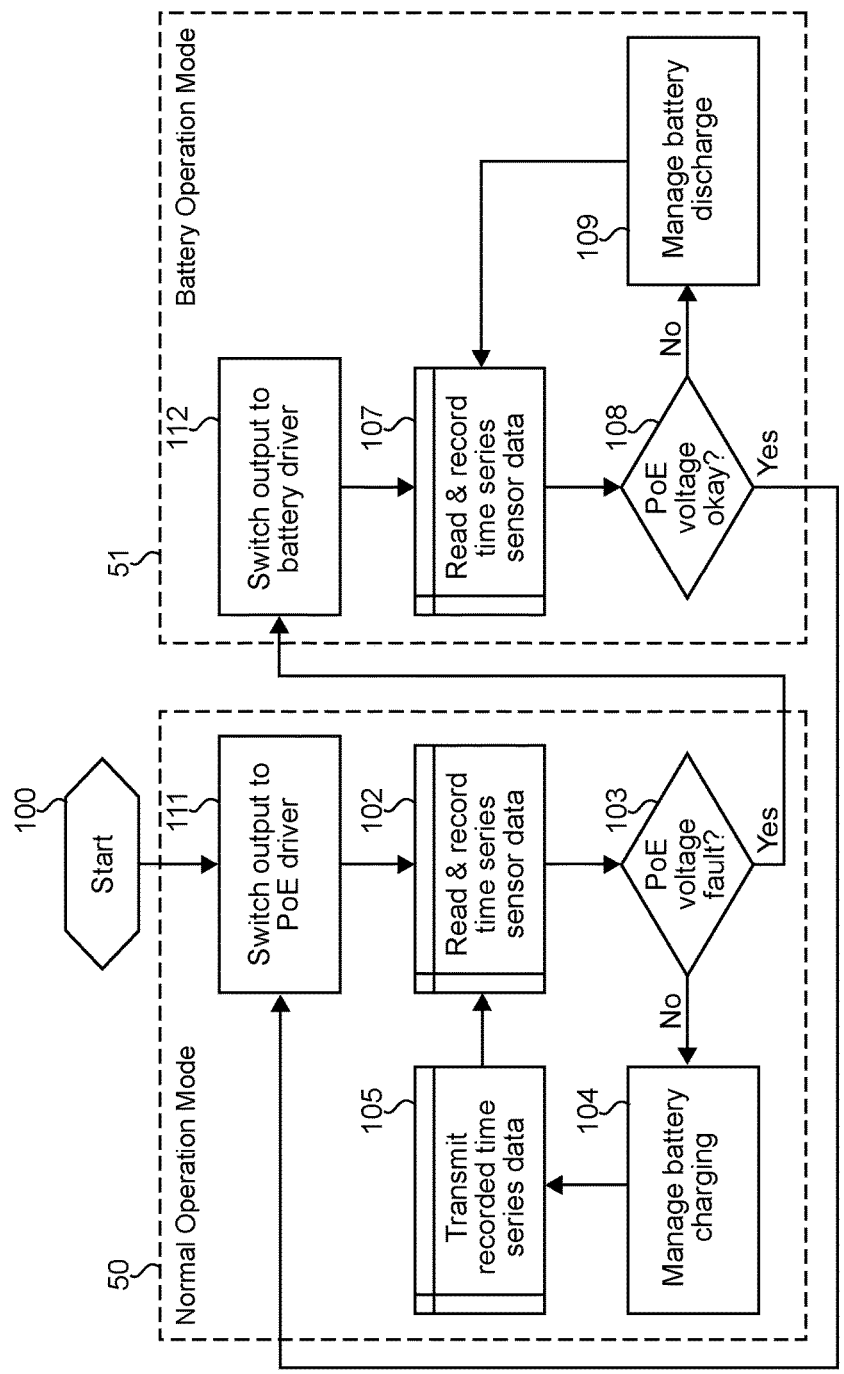
FIG. 9 is a logic flow diagram for the emergency management node shown in FIG. 3.
Figure 13:
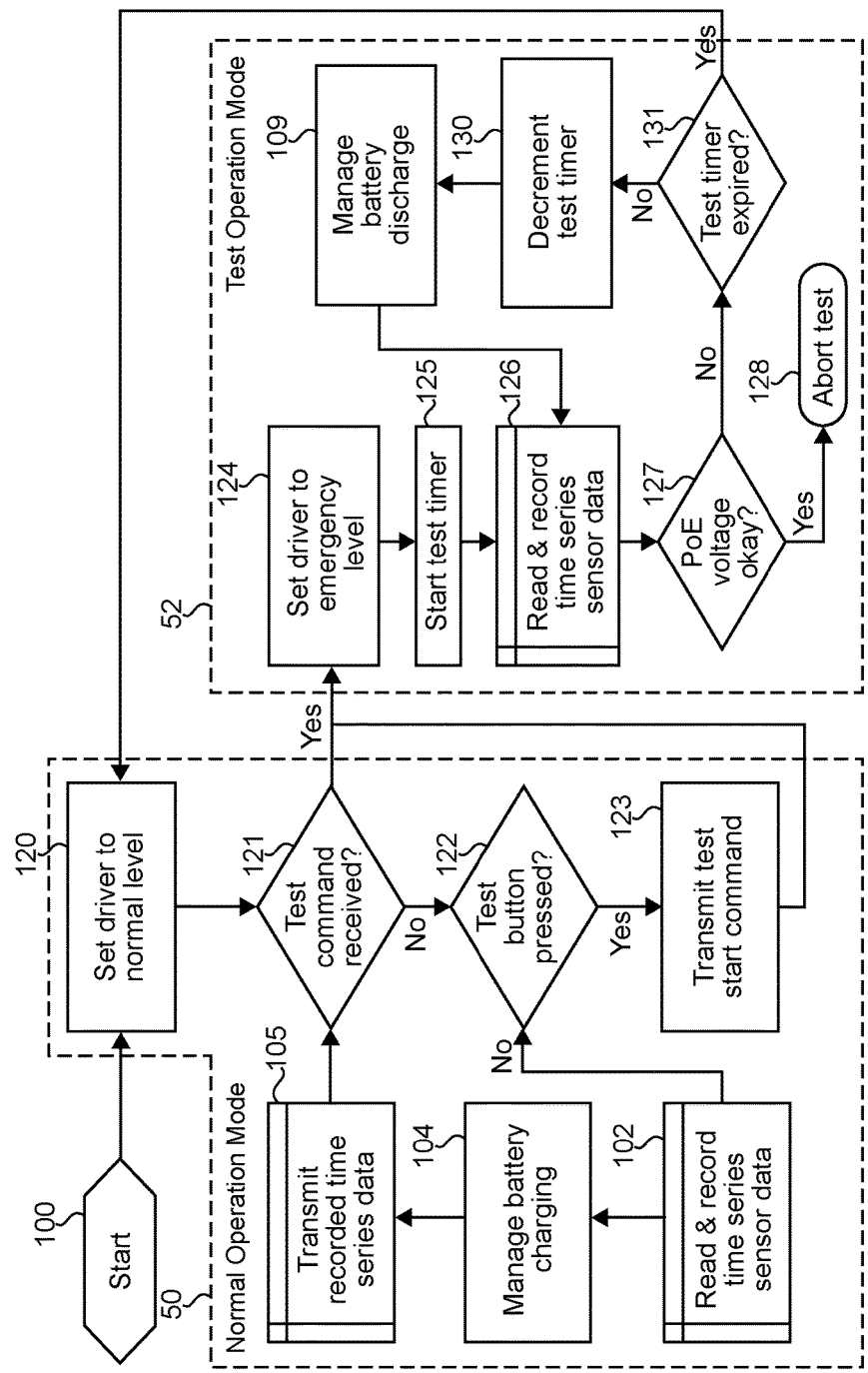
FIG. 13 is a logic flow diagram for test mode logic according to the present disclosure.
Figure 14:
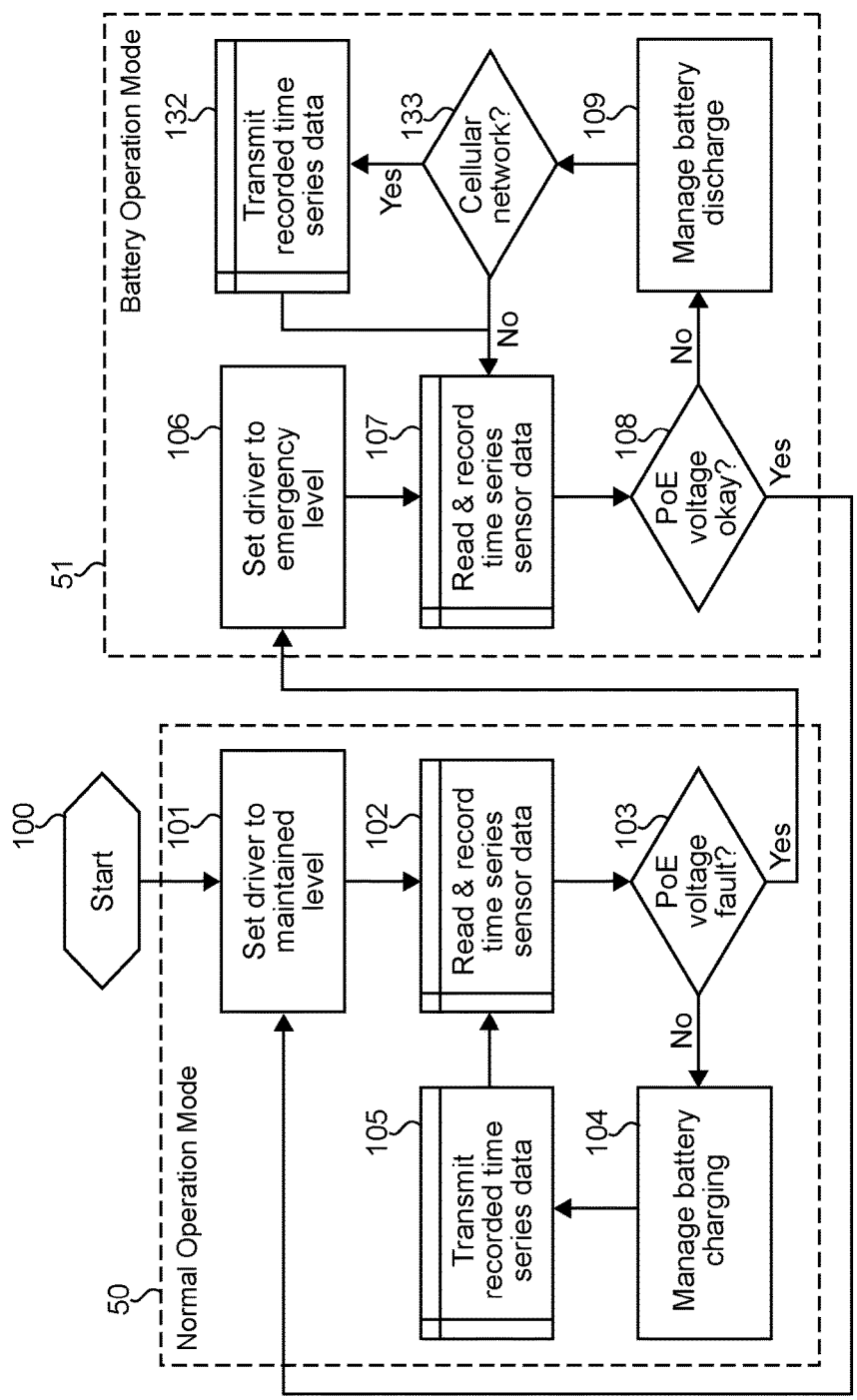
FIG. 14 is a logic flow diagram for an emergency management node that includes a cellular module according to an aspect of the present disclosure.

Referring now in addition to FIG. 9, the logic flow diagram for micro-controller 15 associated with the configuration shown in FIG. 3 is illustrated. Like numbers are used to identify identical process steps. For instance, the process logic begins at step 100 and advances to block 111 and the output switch 47 is set to supply power to the luminaire 14 from the PoE driver 45. If query 103 returns an affirmative indicating that there is a power loss on the power/communication bus 11, the logic changes from the maintained mode 50 over to the emergency mode 51 by advancing to block 112 where the output switch 47 is switched over to the battery driver 46 to now supply power to the luminaire 14 from the battery 31 according to a level that may be predetermined and stored in micro-controller 15. The remaining logic is similar to the earlier configuration. Referring in addition to FIG. 14, the logic may be enhanced if the emergency management node 30 is equipped with the cellular modular 62 as shown in FIG. 3. In such a case, and when operating in the emergency mode 51, a query 133 determines whether there is a cellular network 64 available. If yes, recorded time series data is transmitted at block 132 if the answer to query 133 is negative, then the logic operates virtually identical to that discussed earlier. Referring now in addition to FIG. 13, the logic may be further modified in association with an added test mode logic 52. At block 120, the driver 16 is set to a normal level. At query 121, there is a determination whether a test command has been received over the power/communication bus 11. If yes, then the emergency management system node 30 transitions into the test mode 52. When this occurs, at box 124 the driver 16 is set to the emergency level and the test timer is started at box 125. At box 126, time series sensor data is read and recorded. The logic then executes query 127 to determine whether there is a power outage on the power/communication bus 11. If the answer is yes, the test is aborted at block 128. If not, query 131 asks whether the test timer has expired. If no, the test decrement timer is executed at box 130 and the battery discharge management is executed at box 109. If the test timer has expired (query 131), the logic goes back to block 120 and returns to the maintained mode 50. In the event that test command query 121 returns a negative, query 122 asks whether the test button has been pressed. If no, the logic continues as described earlier in the maintained mode 50. If the query 122 returns a yes, the logic advances to block 123 to transmit a test start command to the power/communication bus 11, and maybe to other EMS nodes 30 in a same EMS zone as described earlier. Next, the logic advances to block 124 to commence operation in the test mode 52.

Figure 10:
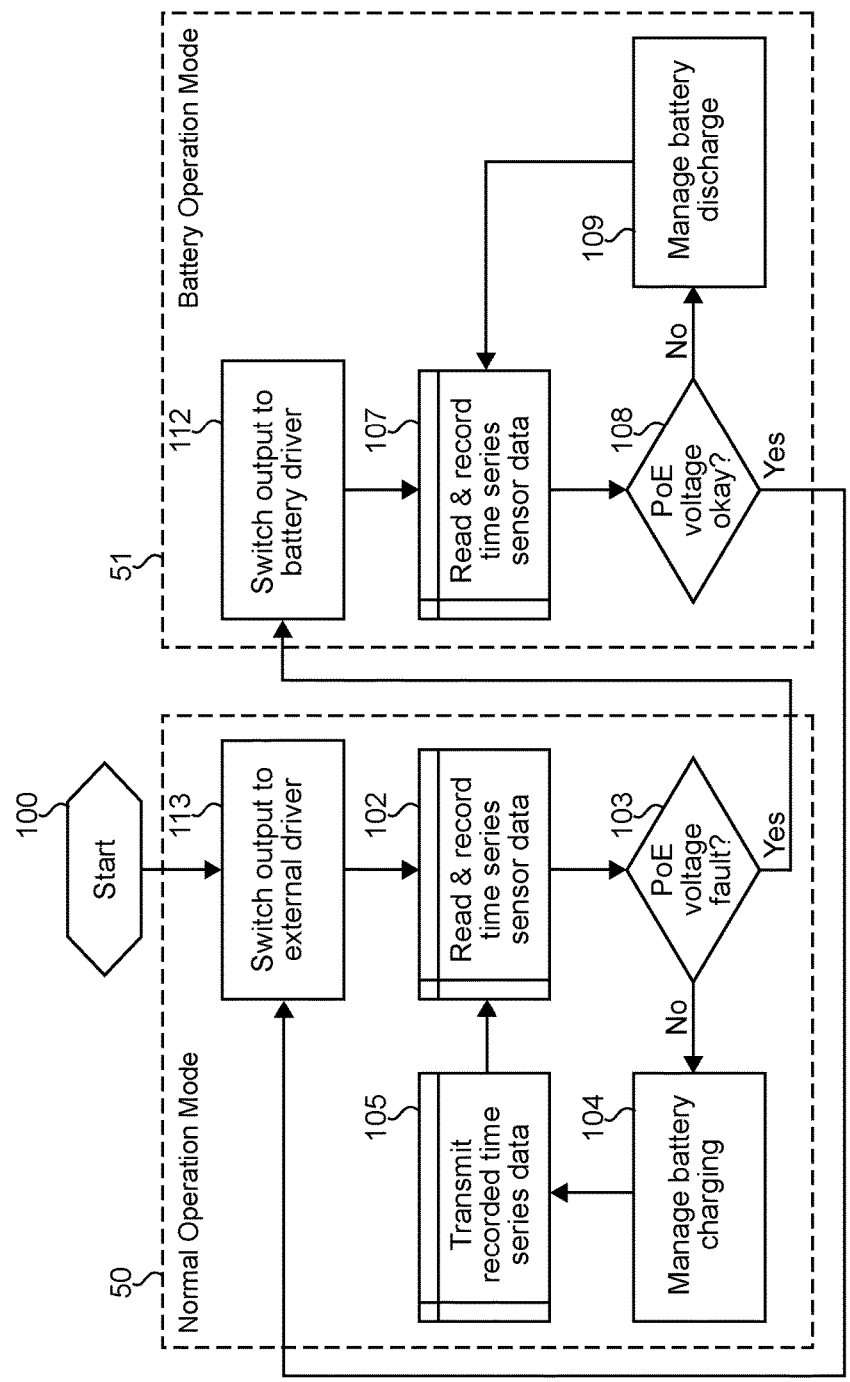
FIG. 10 is a logic flow diagram for the emergency management node shown in FIG. 4.

Referring now in addition to FIG. 10, the logic for operating the dual driver EMS node shown in FIG. 4 is illustrated. This logic includes many of the same steps as described early and those steps have identical numbers and will not again be repeated. However, after start 100, at block 113 the output switch 47 is set to receive power from the external input 35 and the external driver 54. In the even that query 103 indicates that a power loss has occurred in external power source 55, the logic transfers from the maintained mode 50 to the emergency mode 51, and the output switch 47 is changed over to the battery driver 46 to supply luminaire 14 with battery power from battery 31. The remaining portions of the logic are identical to that discussed previously.

Figure 11:
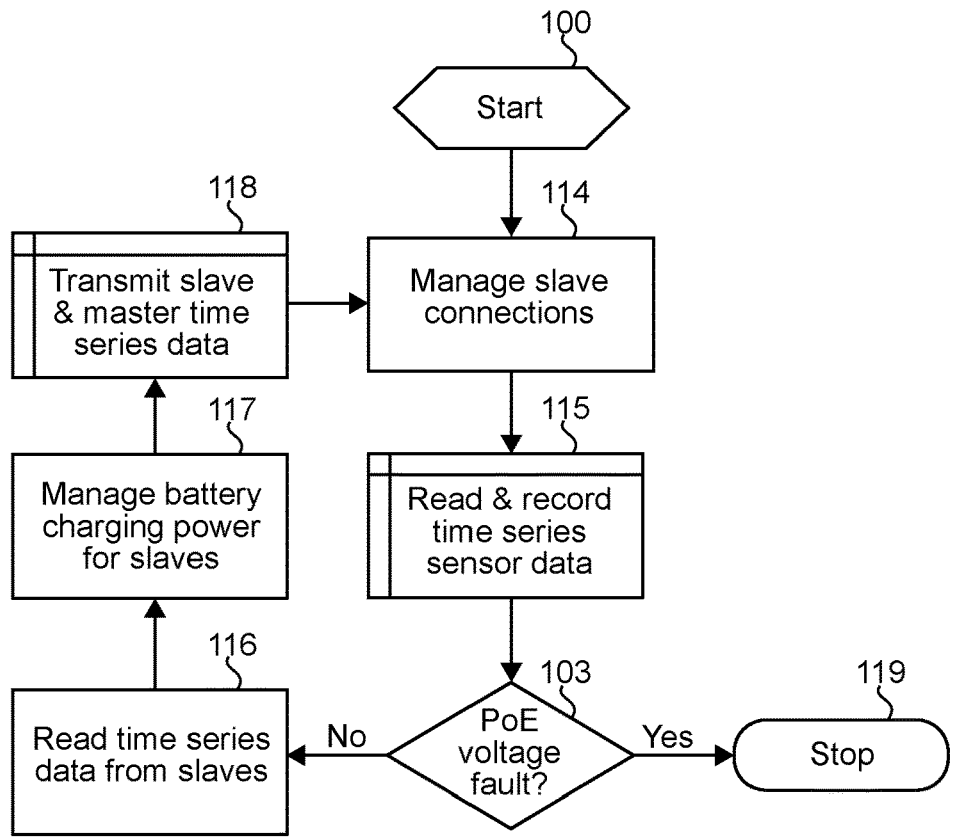
FIG. 11 is a logic flow diagram for the master node shown in FIG. 5.

Referring now in addition to FIG. 11, the logic flow diagram for the micro-controller 15 of the master EMS node 25 illustrated in FIG. 5 is shown. After start 100, at block 114 the slave connections are managed. At block 115, time series sensor data is read and recorded. At block 103, there is a determination as to whether a power failure has occurred on power/communication bus 11. If not, time series data is read from the slaves 26 at block 116. At block 117 the battery charging power for the slaves 26 is managed at block 117. At block 118 the slave and master time series data is transmitted to the power/communication bus 11 and on to the remote data storage and processing computer 18. If the query 103 returns an affirmative, the logic stops at block 119. The logic restarts when power returns to the power communication bus at 100 at some later time.

Figure 12:
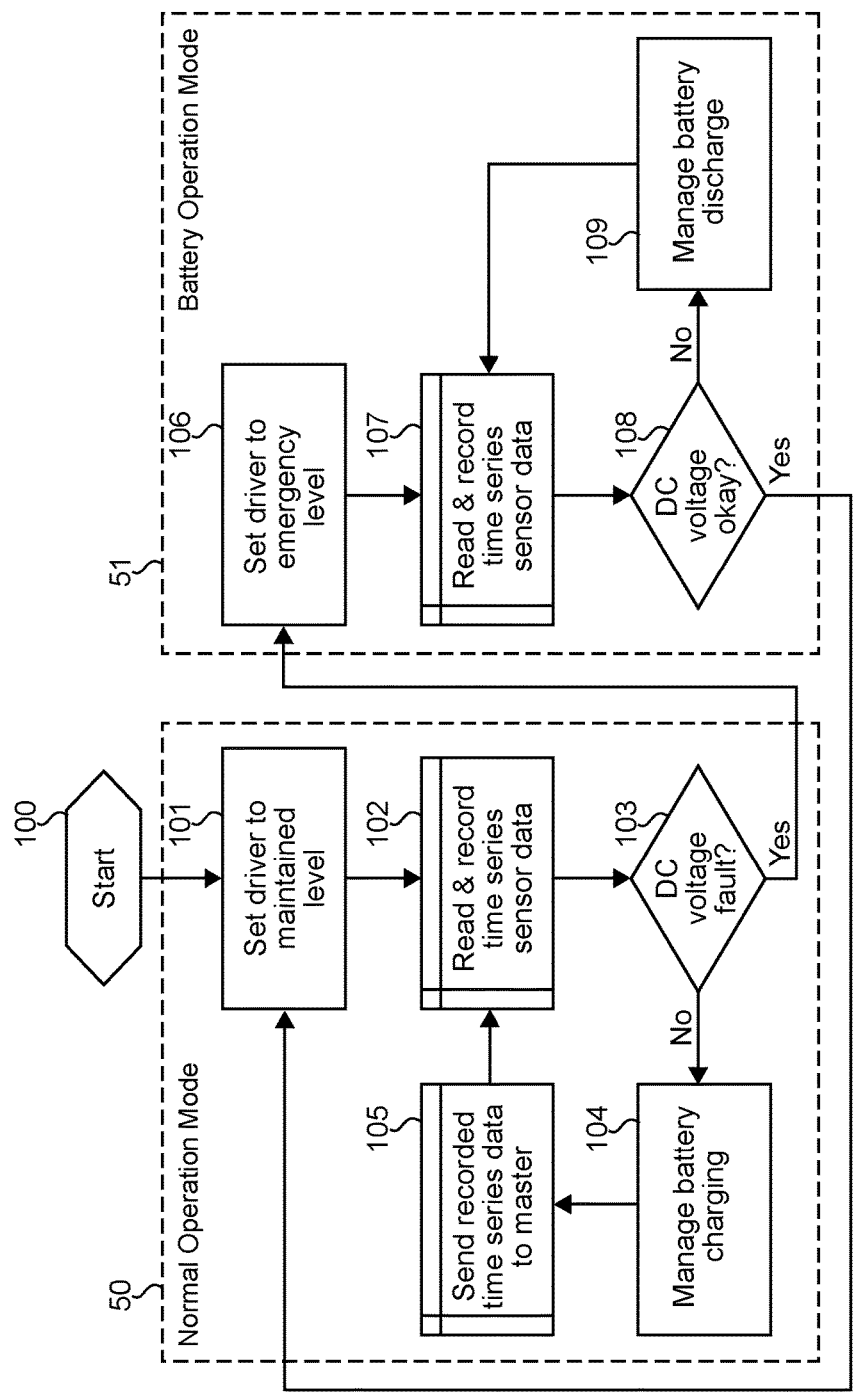
FIG. 12 is a logic flow diagram for each of the slave nodes from FIG. 5.

Referring now in addition to FIG. 12, the logic flow diagram for the individual slave EMS nodes 26 associated with the configuration shown in FIG. 5 is illustrated. The process starts at 100 and proceeds to block 101 where the driver 16 is set to a maintained level according to operation in the maintained mode 50. At block 102 the time series sensor data is read and recorded and at query 103 there is a determination of whether there is a loss of power on the PoE power bus 33, which in turn would indicate a power loss on power/communication bus 11. If no, the battery charging is managed at block 104 and the stored data is sent to the master node 25 at block 105. If the query 103 determines that there is a power loss, the slave EMS node 25 transfers into emergency mode 51 where the driver 16 is set to an emergency level and power is then supplied to luminaire 14 from battery 31 of the individual slave 26. At block 107, the time series sensor data is read and recorded and at query 108 there is a determination of whether the PoE power bus 33 and the power/communication bus 11 are back up. If not, the battery discharge is managed at block 109. If power is back up, the logic transfers back to the maintained mode 50 by resetting the driver 16 to the maintained level for the luminaire 14. The individual drivers 16 of each slave EMS node 26 can be a unified driver 40 as shown in FIG. 2 or be governed by an output switch 47 as shown in FIGS. 3 and 4 without departing from the present disclosure.

Figure 15:
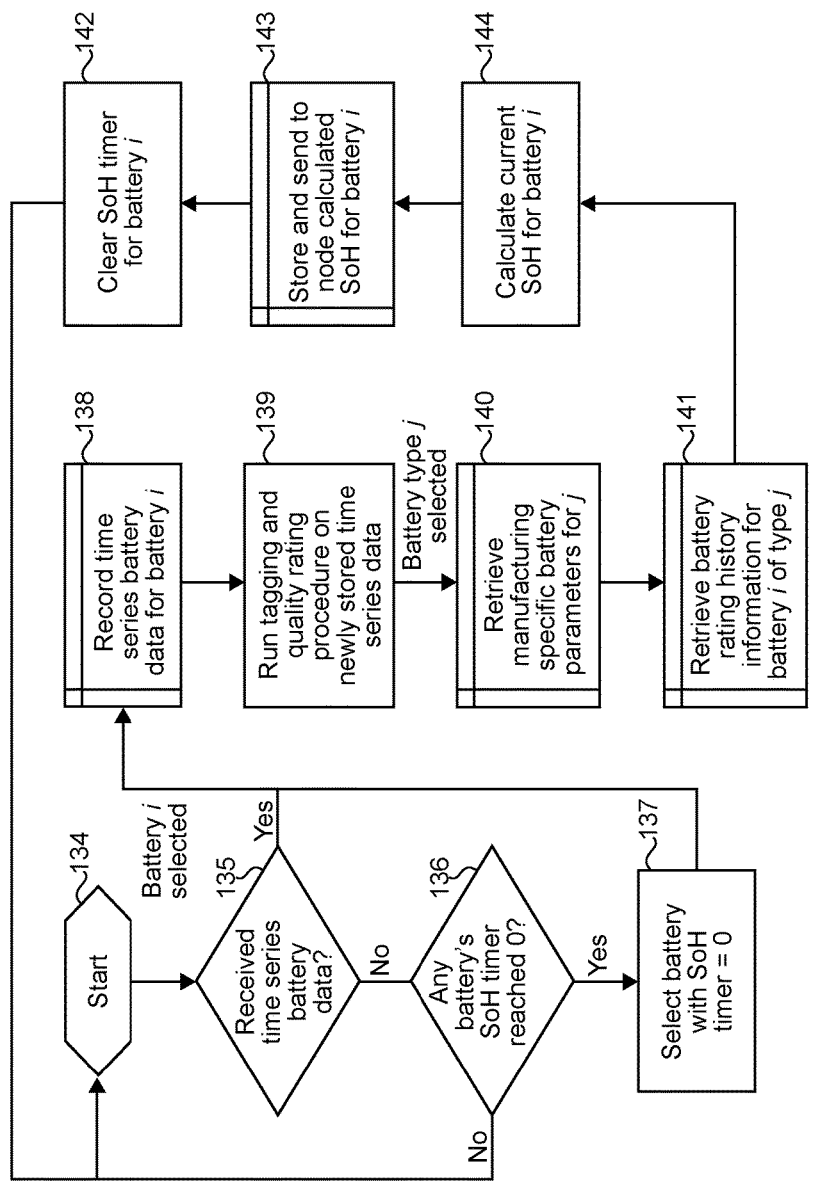
FIG. 15 is a logic flow diagram for processing battery condition data at the remote data storage and processing computer according to the present disclosure.

Referring again to FIG. 6 in addition to FIG. 15, a logic flow diagram for determining a battery state of health value is illustrated. The logic starts at 134 and proceeds to query 135 to determine whether time series battery data has been received. If not, the logic may proceed to query 136 to determine whether the battery's state of health timer has reached zero. If no, the logic loops back to start 134. If query 135 returns a yes, the logic proceeds to block 138 to record the series battery condition data for a specifically identified battery of one emergency management node 30. At block 139, the tagging and quality rating procedure on newly stored time series data is executed for the selected battery and then at block 140, manufacturing data specific to that batter is retrieved, if available. At block 141, the node history data for that specific emergency management node 30 in general and that battery history data for that specific battery 31 is then retrieved from storage. Next at block 144, a current state of health value for the battery is calculated. This state of health value is then stored and sent to the specific EMS node 30 at block 143. At block 142, the state of health timer for that specific battery is cleared and the logic returns to start. If query 136 returns a positive, the selected battery 31 with a state of health timer equal to zero is selected and the logic then returns to block 138 as described.

Figure 17:
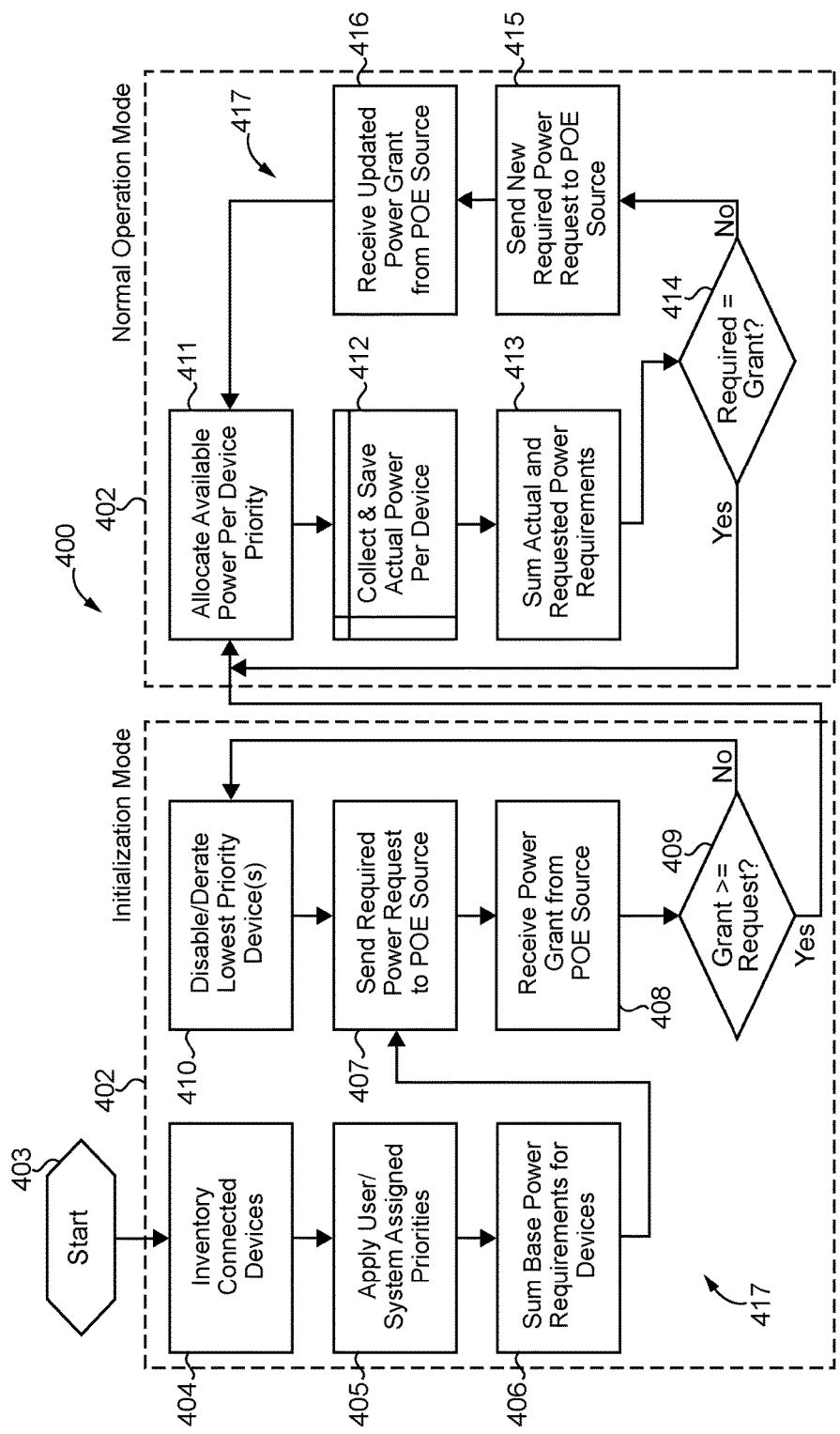
FIG. 17 is a logic flow diagram for a power allocation algorithm according to the present disclosure.

Referring now to FIG. 17, a logic flow diagram for an example power allocation algorithm 400 according to the present disclosure is illustrated. The power allocation algorithm 400 may include an initialization mode 401 and a normal operation mode 402. One could expect that the micro-controller 15 associated with each node 28, 30 is programmed to include, and configured to execute, a stored power allocation power allocation algorithm 400. After start 403 and during the initialization mode 401, the algorithm inventories all connected powered devices at block 404. Recalling in relation to FIG. 16 that each node may include numerous powered devices in addition to the driver 16 and luminaire 14 associated with the individual node 28, 30. Next, at block 405, the algorithm may apply user configured and system assigned priorities to each individual powered device. Next, at block 406 as part of a power request algorithm 417, the algorithm sums the base power requirements for the power devices, and communicate a total power request to the power sourcing equipment at block 407. Thereafter, at block 408, the power sourcing equipment may communicate confirmation of the power request back to the individual node and communicate a power allocation level from the power sourcing equipment, which may be different than the requested power level. At query 409, the algorithm determines whether the power granted is greater than or equal to the power requested. If less than the requested power is allocated, the algorithm goes to block 410 where the lowest priority device(s) is derated or disabled in order to account for the fact that the node at this given instant has only been allocated enough power to power its devices at less than a desired level. On the otherhand, if query 409 returns a positive, in that the granted power is equal to or greater than the requested power level, the algorithm moves to block 411 where the granted power for the individual node was allocated according to the configured device priority schedule. The algorithm then continues in the normal operation mode to execute the power request algorithm by collecting and saving out actual power of all of the power devices 200 for block 412. Again the sum of the actual and requested power requirements are calculated at block 413. At query 14, the algorithm determines whether the requested required power is equal to the granted power level. If yes, the algorithm returns to block 411 to allocate the granted power among the powered devices 200. If the requested required power is not equal to the granted power, the algorithm goes to block 415 to send a new required power request to the power sourcing equipment. The power sourcing equipment then receives and communicates confirmation of the updated power request and grant from the power sourcing equipment at block 416. Next, at block 411, the granted power is allocated among the individual power devices 200 of the node 28, 30. This loop continues in the normal operation mode 411 by continuously dynamically adjusting the requested power level, the granted power level and the allocation of the granted power among the power devices at the individual node.

Conceptually, the power allocation algorithm 400 can be thoughts of as utilizing a collector that measures the power currently being used by each of its subsystems, given the current state of their parameters. For example, an LED light being driven at 10% level might consume three watts. For each device and subsystem, it then extrapolates a requested power, which may be the maximum power that could be used nearly instantly (e.g. approximately thirty watts, for the example light). Some device's power needs change over time. For instance, a battery charge circuit needs little power during normal circumstances when the battery is nearly at a full charge, whereas when it is time to run a charge cycle, the battery charger needs may be significant. The conceptual collector runs continuously, taking these dynamic needs into account. The minimum power requirement may also be specified for each device or subsystem. The conceptual collector uses this information to calculate a total requested power for the end point. In addition to the conceptual collector, the power allocation algorithm 400 can also be considered to be continuously running an allocator that apportions power to devices and subsystems. If the current negotiated PoE power limit is sufficient to meet the total requested power, then all devices and subsystems get their requested power. Otherwise, power is allocated to each device or subsystem on the basis of weighted priorities, after first taking into account any minimum power requirements that have been specified. The conceptual allocator may also take into account other factors during its allotment process including but not limited to artificial power limits due to load shedding. The power allocation algorithm 400 also can conceptually be considered to include a negotiator that continuously tries to balance the total desired power and the allocated or granted PoE power. If the granted PoE power limit is lower than the desired power, the negotiator requests that more power be granted. If the granted PoE limit is too high, it requests a lower power limit. Hysteresis, in the form of smoothing or separate limits for each direction, may be used to prevent rapid oscillations in the system.

In one example instance, a battery powered LED light in an emergency node 30 is powered by battery during a power failure on the power/communication bus 11. After normal power is restored, the battery is recharged for a period of time. During the recharge cycle, the node 30 consumes substantially more power than during normal operations in a maintained mode, and so more power is requested and consumed at the emergency node during the recharge. In another example, during peak power usage, based on time and other criteria, power granted to the individual node may be artificially lowered due to load shedding. This may occur on the end point by configuring the power allocation algorithm accordingly, or upstream on the power sourcing equipment. In either case, the node reacts appropriately, by portioning the granted power to its devices and subsystems according to their needs and previously assigned priority levels.

Figure 18:
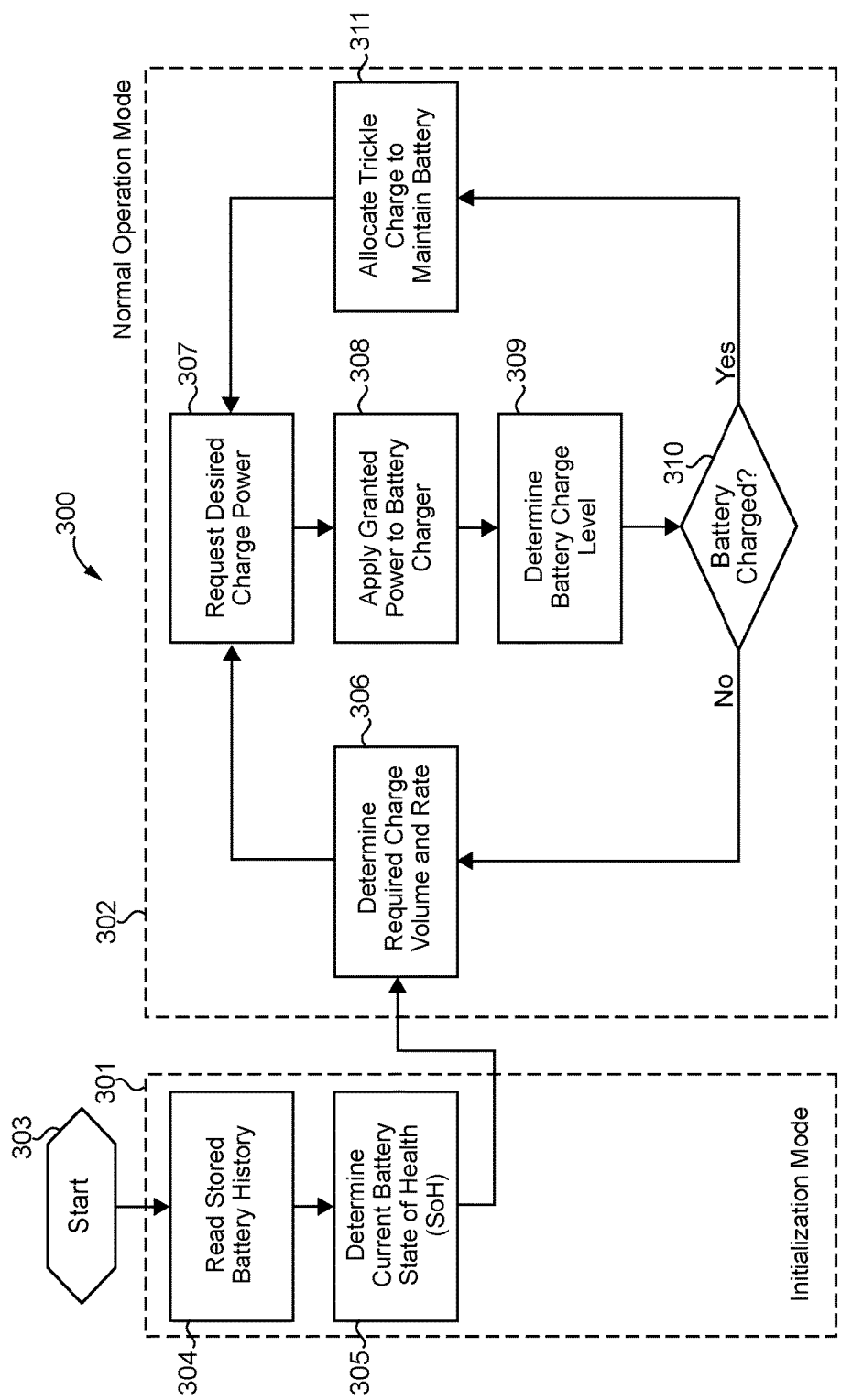
FIG. 18 is a logic flow diagram for a charge control algorithm according to another aspect of the present disclosure.

Referring now to FIG. 18, a logic flow diagram for a charge control algorithm 300 according to the present disclosure is illustrated. Those skilled in the art will appreciate that the micro-controller 15 for the emergency node 30 is configured to execute the charge control algorithm to manage the PoE battery charger 32 when the system is operated in a maintained mode. After start 303, during an initialization mode 301, the charge control algorithm 300 may restore the battery history information at block 304. This information may be resident in memory connected to micro-controller 15, or maybe communicated from a remote location in the cloud. Next, at block 305, the current battery state of health is determined. Those skilled in the art will appreciate that knowing the type of the battery, its manufacturer, its number of charging cycles, temperature and numerous other factors can be leveraged to determine an efficient strategy for recharging the battery. Thus, at block 306, the algorithm 300 determines a required charge volume and rate for recharging the associated battery 31. At block 307, a requested desired charge power is communicated as part of a total requested power by the power allocation algorithm 400 of FIG. 17. At block 308, the granted power to the battery charger is allocated. Next, at block 309, the battery charge level is determined, such as by communicating information from a back up voltage sensor 83 (FIG. 2) to the respective micro-controller 15. At query 310, the battery charge control algorithm 300 asks whether the battery is charged above some predetermined threshold. If this query returns an affirmative, the charge control algorithm 300 moves to block 311 where a trickle charge is allocated to the battery charger to maintain the battery in a charged condition. If query 310 returns a negative, the charge control algorithm 300 again goes to block 306 to determine a required or requested volume and charge rate. Thus, in operation, charge control algorithm 300 can be considered a closed loop charge control strategy that dynamically adjusts an allocation of power to the PoE battery charger responsive to the sensed charge level of the battery. Thus, one could expect the power demands of the battery charger to drop as the charge level of the battery approaches a fully charged condition, with this charge level reduction possibly taking into account specific characteristics of the individual battery. Normally, the system contemplates assigning a highest priority to the power requested by charge control algorithm 300, but this may be a user-configurable priority. In operation, the charge control algorithm 300 may operate as a PID controller such that the charge current algorithm limits the current, and hence power drawn by the battery, keeping it at or below a dynamic threshold. If needed, the negotiation aspect of power allocation algorithm 400 may ask for and may be granted more power for the emergency node 30 during a charge cycle. The power requirements may be based on the maximum needed to run the charge control algorithm 300 at its highest power for the given battery. However, user settable priorities may control how much power is actually allocated to the charge circuit of the battery and light output in the event there is insufficient power for both.

Figure 19:
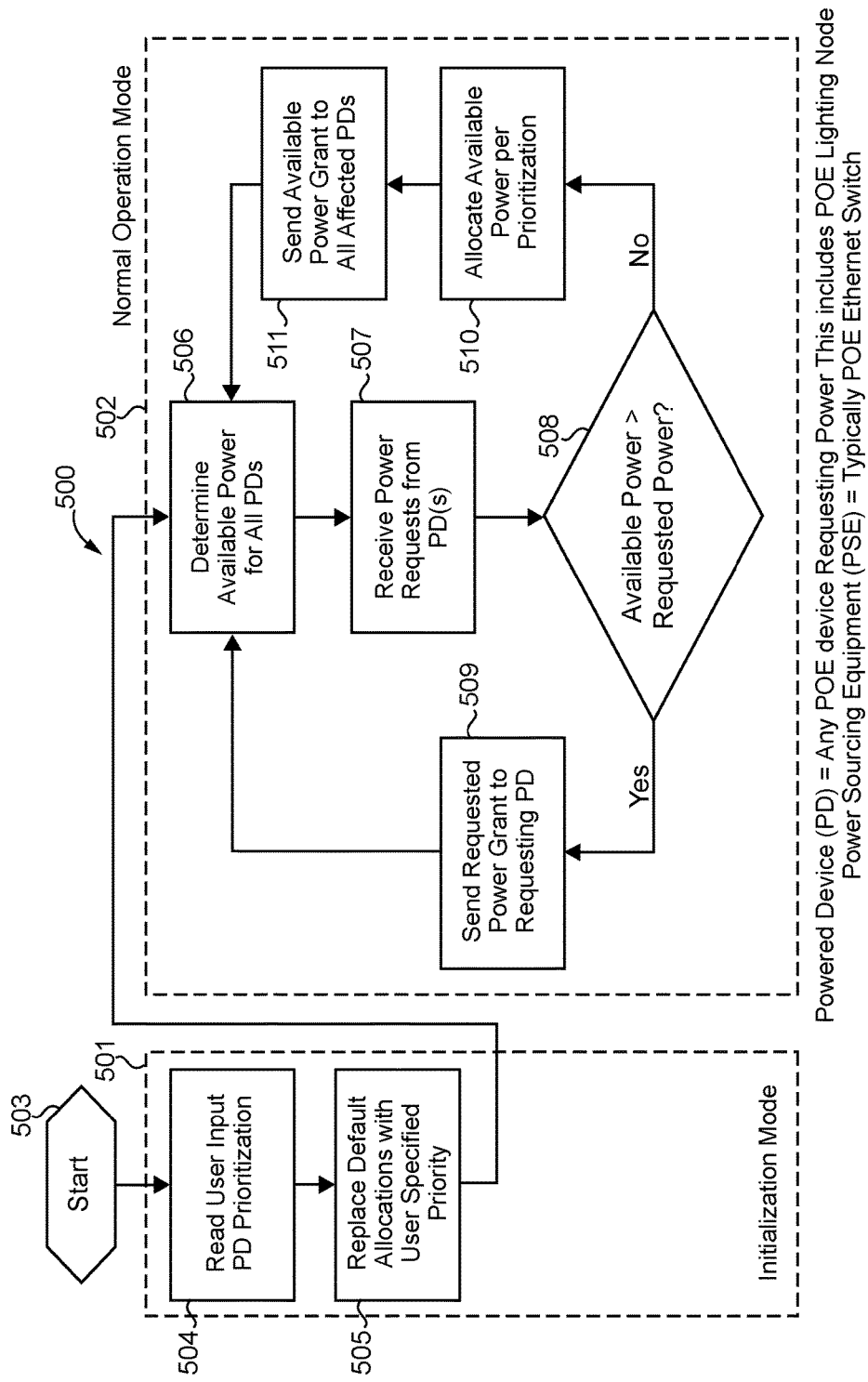
FIG. 19 is a logic flow diagram for a power prioritization algorithm according to the present disclosure.

Referring now to FIG. 19, the power sourcing equipment, which may be a mixed band device or a ethernet switch 17 as shown in FIG. 1 may include a power prioritization algorithm that is configured to distribute available power on the power/communication bus 11 to individual nodes based upon preset priorities. The power prioritization algorithm 500 begins at start 503 and proceeds to block 504 where user input power device prioritizations are read. At block 505, default allocation prioritizations may be replaced with user specified priorities. In general, the default is to place the highest priority on providing power to the emergency nodes so that the emergency nodes can recharge their respective batteries as a highest priority after a power loss event. However, this default can be altered through user configurations. At block 505, the power prioritization algorithm determines the available power for all of the nodes and all of the powered devices whether part of an individual node or separated therefrom. At block 507, the power prioritization algorithm receives power requests from the individual nodes and power devices via execution of the power allocation algorithm 400 discussed earlier with regard to FIG. 17. At query 508, the power prioritization algorithm determines if the available power is greater than or equal to the total requested power. If yes, all of the power devices whether part of a node or on their own, receive the requested power grant and so all the power devices are temporarily powered at their full desired level. If query 508 returns a negative, then power is granted to individual nodes as per the prioritization schedule, with a default being that power requested by the emergency nodes may take priority. After the prioritization schedule is applied, at block 511, the power grant is communicated to all the effective power devices. Thereafter, the loop continues by again determining power availability for the entire system at block 506.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

LIST OF ELEMENTS

Title: Power Over Ethernet Lighting System with Battery Charge Control Algorithm
File: Platformatics-2
1. building
2. remote location
10. power over ethernet lighting system
11. power/communication bus
12. nodes
13. PoE interface
14. PoE luminaire
15. micro-controller
16. driver
17. common area controller
18. remote data storage and data processing computer
20. single driver EMS node
22. dual driver EMS node
24. external driver
25. master EMS node
26. slave EMS node
28. maintained node
30. emergency management node
31. rechargeable battery
32. PoE battery charger
33. PoE power bus
34. external power bus
35. external input
40. unified PoE/battery driver
41. first electrical connection
42. second electrical connection
43. first electrical connection
45. PoE driver
46. battery driver
47. output switch
48. first electrical connection
49. second electrical connection
50. maintained mode
51. emergency mode
54. external PoE driver
55. external power source
56. test mode
62. cellular module
74. wireless cellular network
80. node temperature sensor
81. interface voltage sensor
82. interface current sensor
83. battery voltage sensor
84. battery current sensor
85. battery temperature sensor
86. driver voltage sensor
87. driver current sensor
88. luminaire temperature sensor
90. test button
95. Zone 1
96. Zone 2
97. EMS Zone
100. start
101. block
102. block
103. query
104. block
105. block
106. block
107. block
108. query
109. block
111. block
112. block
113. block
114. block
115. block
116. block
117. block
118. block
119. stop
120. block
121. query
122. query
123. block
124. block
125. block
126. block
127. query
128. abort test
130. block
131. query
132. block
133. query
134. start
135. query
136. query
137. block
138. block
139. block
140. block
141. block 142. block
143. block
144. block
200. powered auxiliary devices
201. keypad and indicator
202. sensor interface
203. other powered device(s)
300. charge control algorithm
301. initialization mode
302. normal operation mode
303. start
304. block
305. block
306. block
307. block
308. block
309. block
310. query
311. block
400. power allocation algorithm
401. initialization mode
402. normal operation mode
403. start
404. block
405. block
406. block
407. block
408. block
409. query
410. block
411. block
412. block
413. block
414. query
415. block
416. block
500. power prioritization algorithm
501. initialization mode
502. normal operation mode
503. start
504. block
505. block
506. block
507. block
508. query
509. block
511. block

The invention claimed is:

1. A power over ethernet lighting system comprising:
a power/communication bus;
a plurality of nodes electrically connected to the power/communication bus with a PoE interface, and each of the nodes being electrically connected to a PoE luminaire;
each of the plurality of nodes including the PoE interface, a micro-controller, and a driver electrically connected to the PoE luminaire;
at least one of the nodes is an emergency management node that includes a rechargeable battery and a PoE battery charger, and the micro-controller is electrically connected to the rechargeable battery;
wherein the system has a maintained mode in which the PoE luminaire of each of the nodes, including the emergency management node, is powered by electricity from the power/communication bus as controlled by the respective micro-controller, which is powered by one of the power/communication bus and the rechargeable battery;
wherein the system has an emergency mode characterized by a power loss on the power/communication bus, and the PoE luminaire of the emergency management node is powered by electricity from the rechargeable battery as controlled by the respective micro-controller, which is powered by the rechargeable battery;
wherein the emergency management node includes a charge sensor operably coupled to the battery and in communication with the respective micro-controller; and
the micro-controller of the emergency management node includes a charge control algorithm configured to determine a charge level of the battery based on a signal from the charge sensor, and configured to dynamically adjust an allocation of power to the PoE battery charger responsive to the charge level.

2. The system of claim 1 wherein the micro-controller of the emergency management node includes a dynamic power allocation algorithm configurable to prioritize an allocation of power to the PoE battery charger over the driver electrically connected to the PoE luminaire in the maintained mode, and prioritize the allocation of power to the driver electrically connected to the PoE luminaire in the emergency mode.

3. The system of claim 2 wherein the dynamic power allocation algorithm is configured to set a relative power prioritization among the PoE battery charger and the driver electrically connected to the PoE luminaire responsive to a user input configuration, which includes prioritizing the driver electrically connected to the PoE luminaire over the battery charger.

4. The system of claim 2 wherein the emergency management node includes a powered auxiliary device; and
the dynamic power allocation algorithm is configured to allocate no power to the auxiliary device in the emergency mode.

5. The system of claim 4 wherein the powered auxiliary device is one of a test button, a slave node and a cellular module.

6. The system of claim 2 wherein the dynamic power allocation algorithm is configured to power the PoE luminaire at a reduced power level and the battery charger at a full power level when the emergency management node receives a power level inadequate to power the PoE luminaire and the battery charger at full power.

7. The system of claim 1 wherein the micro-controller of each of the nodes includes a power request algorithm configured to determine a desired power level for each powered device of the respective node, and determine a requested power level based upon a sum of the desired power levels, and communicate the requested power level to a power sourcing equipment electrically connected to the power/communication bus.

8. The system of claim 7 wherein the micro-controller of the emergency management node includes a dynamic power allocation algorithm configurable to prioritize an allocation of power to the PoE battery charger over the driver electrically connected to the PoE luminaire in the maintained mode, and prioritize the allocation of power to the driver electrically connected to the PoE luminaire in the emergency mode.

9. The system of claim 7 wherein the dynamic power allocation algorithm is configured to receive a confirmation communication from the power sourcing equipment that the requested power level was received; and the dynamic power allocation algorithm is configured to receive a power level allocation, which is less than or equal to the requested power level from the power sourcing equipment.

10. The system of claim 7 wherein the power sourcing equipment includes a node prioritization algorithm configured to prioritize power allocation to the emergency management node over at least one of the plurality of nodes that is not an emergency management node.

11. The system of claim 7 wherein the power sourcing equipment includes an ethernet switch and a common area controller electrically connected to the power/communication bus and being in communication with each of the plurality of nodes.

12. A method of operating a power over ethernet lighting system that includes a power/communication bus; a plurality of nodes electrically connected to the power/communication bus with a PoE interface, and each of the nodes being electrically connected to a PoE luminaire; each of the plurality of nodes including the PoE interface, a micro-controller, and a driver electrically connected to the PoE luminaire; at least one of the nodes is an emergency management node that includes a rechargeable battery and a PoE battery charger, and the micro-controller is electrically connected to the rechargeable battery; wherein the system has a maintained mode in which the PoE luminaire of each of the nodes, including the emergency management node, is powered by electricity from the power/communication bus as controlled by the respective micro-controller, which is powered by one of the power/communication bus and the rechargeable battery; wherein the system has an emergency mode characterized by a power loss on the power/communication bus, and the PoE luminaire of the emergency management node is powered by electricity from the rechargeable battery as controlled by the respective micro-controller, which is powered by the rechargeable battery, and the method comprising the steps of:

communicating a charge level of the rechargeable battery to the micro-controller of the emergency management node, which includes a charge control algorithm;

adjusting an allocation of power to the PoE battery charger based on the charge level responsive to execution of the charge control algorithm.

13. The method of claim 12 wherein the micro-controller of the emergency management node includes a dynamic power allocation algorithm, and the method includes a step of:

configuring a relative power prioritization among the PoE battery charger and the driver electrically connected to the PoE luminaire responsive to a user input to the dynamic power allocation algorithm.

14. The method of claim 13 wherein the method includes prioritizing the allocation of power to the PoE battery charger over the driver electrically connected to the PoE luminaire in the maintained mode; and prioritizing the allocation of power to the driver electrically connected to the PoE luminaire in the emergency mode.

15. The method of claim 12 wherein the emergency management node includes a powered auxiliary device;

powering the auxiliary device in the maintained mode;
allocating no power to the auxiliary device in the emergency mode.

16. The method of claim 12 wherein the micro-controller of the emergency management node includes a dynamic power allocation algorithm, and the method includes a step of:

allocating a reduced power level to the PoE luminaire and full power level to the PoE battery charger when the emergency management node receives a power level inadequate to power the PoE luminaire and the PoE battery charger at full power.

17. The method of claim 12 wherein the micro-controller of each of the nodes includes a power request algorithm configured to determine a desired power level for each powered device of the respective node; and the method includes:

determining a requested power level based upon a sum of the desired power levels of each powered device of the respective node; and communicating the requested power level to a power sourcing equipment electrically connected to the power/communication bus.

18. The method of claim 17 includes receiving a confirmation communication from the power sourcing equipment that the requested power level was received; and each of the nodes receiving a respective power level allocation, which is less than or equal to the respective requested power level from the power sourcing equipment.

19. The method of claim 17 wherein the power sourcing equipment includes a node prioritization algorithm; and the method includes:

prioritizing power allocation to the emergency management node over at least one of the plurality of nodes that is not an emergency management node.

20. The method of claim 19 wherein the power sourcing equipment includes an ethernet switch and a common area controller electrically connected to the power/communication bus and being in communication with each of the plurality of nodes; the method includes:

receiving a requested power level from each of the nodes;
communicating an allocated power level to each of the nodes based on the requested power levels.

* * * * *